United States Patent
Kobayashi

(10) Patent No.: US 7,606,896 B2
(45) Date of Patent: Oct. 20, 2009

(54) DEVICE, METHOD, AND PROGRAM FOR ESTIMATING QUALITY-DETERIORATED AREA OF NETWORK

(75) Inventor: Masayoshi Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 483 days.

(21) Appl. No.: 11/355,953

(22) Filed: Feb. 17, 2006

(65) Prior Publication Data

US 2006/0190620 A1     Aug. 24, 2006

(30) Foreign Application Priority Data

Feb. 24, 2005   (JP) .............................. 2005-049708

(51) Int. Cl.
*G06F 15/173* (2006.01)
(52) U.S. Cl. .................. 709/224; 709/223; 709/242
(58) Field of Classification Search .............. 709/223, 709/224, 242
See application file for complete search history.

(56) References Cited

U.S. PATENT DOCUMENTS

| | | | |
|---|---|---|---|
| 5,559,810 A * | 9/1996 | Gilbert et al. .............. | 714/704 |
| 6,374,196 B1 | 4/2002 | Hashimoto et al. | |
| 6,885,641 B1 * | 4/2005 | Chan et al. .................. | 370/252 |
| 7,492,707 B2 | 2/2009 | Tanaka et al. | |
| 2003/0142658 A1 * | 7/2003 | Ofuji et al. .................. | 370/349 |
| 2003/0152034 A1 * | 8/2003 | Zhang et al. ................ | 370/252 |
| 2004/0165526 A1 * | 8/2004 | Yada et al. .................. | 370/228 |
| 2005/0227716 A1 * | 10/2005 | Tanaka et al. .............. | 455/507 |

FOREIGN PATENT DOCUMENTS

| | | |
|---|---|---|
| JP | 2000-048277 A | 2/2000 |
| JP | 2000-196651 A | 7/2000 |
| JP | 2002-271392 A | 9/2002 |
| WO | WO 2004/098225 A1 | 11/2004 |

\* cited by examiner

*Primary Examiner*—Larry D Donaghue
*Assistant Examiner*—Brian J Gillis
(74) *Attorney, Agent, or Firm*—Foley & Lardner LLP

(57) ABSTRACT

An estimating device includes a collecting unit for collecting flow quality information including a transmitter and receiver address, and flow communication quality; a collecting unit for collecting structure information; a table managing unit and a table storage unit for finding, based on the collected flow quality information of the network, a link that the flow goes through, judging occurrence of quality deterioration in the flow, and managing a result thereof in a table; and a estimating unit for outputting, when there is quality deterioration in one or more flow, a subset including the link that an arbitrary flow with quality deterioration goes through among the subset of the set of links that the set of the arbitrary flows with the quality deterioration go through, which also has the minimum number of elements, as a quality deteriorated area in the table managed by the flow-quality/via-link table managing unit.

18 Claims, 26 Drawing Sheets

FIG. 6

| | Transmission terminal address | Reception terminal address | L10 | L20 | L30 | L80 | L120 | L140 | L150 | L161 | L171 | L191 | L201 | L210 | L220 | Quality flag |
|---|---|---|---|---|---|---|---|---|---|---|---|---|---|---|---|---|
| F1 | T5 | T6 | | 1 | | | | | 1 | 1 | | | | | | 1 |
| F2 | T2 | T9 | 1 | 1 | 1 | | 1 | | | | | 1 | | | | 1 |
| F3 | T4 | T9 | | 1 | 1 | | | 1 | | | | 1 | | | | 1 |
| F4 | T12 | T7 | | | | 1 | | | | | 1 | | | | 1 | 1 |
| F5 | T11 | T10 | | | 1 | 1 | | | | | | | 1 | 1 | | 1 |

Via-link

FIG. 10

| Link | Probability for being cause of quality deterioration |
|---|---|
| L10 | 0.001 |
| L11 | 0.001 |
| L20 | 0.001 |
| ⋮ | ⋮ |
| L210 | 0.001 |

FIG. 12

| | Transmission terminal address | Reception terminal address | Deterioration cause probability | L10 | L20 | L30 | L80 | L120 | L140 | L150 | L161 | L171 | L191 | L201 | L210 | L220 | Quality flag |
|---|---|---|---|---|---|---|---|---|---|---|---|---|---|---|---|---|---|
| | | | | 0.001 | 0.001 | 0.05 | 0.001 | 0.001 | 0.001 | 0.01 | 0.001 | 0.01 | 0.001 | 0.001 | 0.001 | 0.001 | |
| F1 | T5 | T6 | | | 1 | | | | | | | | | | | | 1 |
| F2 | T2 | T9 | | 1 | 1 | 1 | | | | | | | | | | | 1 |
| F3 | T4 | T9 | | | 1 | 1 | | | | | | | 1 | | | | 1 |
| F4 | T12 | T7 | | | | 1 | 1 | | 1 | | | 1 | | | | | 1 |
| F5 | T11 | T10 | | | | 1 | 1 | 1 | | | | | | 1 | 1 | 1 | 1 |

Via-links

FIG. 15

| | Transmission terminal address | Reception terminal address | L10 | L20 | L30 | L80 | L120 | L140 | L150 | L161 | L171 | L191 | L201 | L210 | L220 | L141 | L181 | Quality flag |
|---|---|---|---|---|---|---|---|---|---|---|---|---|---|---|---|---|---|---|
| F1 | T5 | T6 | 1 | 1 | | | | | 1 | 1 | | | | | | | | 1 |
| F2 | T2 | T9 | | 1 | 1 | | 1 | | | | | 1 | | | | | | 1 |
| F3 | T4 | T9 | | 1 | 1 | | | 1 | | | | 1 | | | | | | 1 |
| F4 | T12 | T7 | | | | 1 | | | | | | | | | 1 | | | 1 |
| F5 | T11 | T10 | | | 1 | 1 | | | | | 1 | | 1 | 1 | | | | 1 |
| F6 | T2 | T8 | 1 | | 1 | | 1 | | | | 1 | | | | | | 1 | 0 |
| F7 | T5 | T4 | | 1 | | | | | 1 | | | | | | | 1 | | 0 |

Via-links: L10, L20, L30, L80, L120, L140, L150, L161, L171, L191, L201, L210, L220, L141, L181

FIG. 16

| | Transmission terminal address | Reception terminal address | L80 | L140 | L161 | L171 | L191 | L201 | L210 | L220 | Quality flag |
|---|---|---|---|---|---|---|---|---|---|---|---|
| F1 | T5 | T6 | | | 1 | | | | | | 1 |
| F2 | T2 | T9 | | | | | 1 | | | | 1 |
| F3 | T4 | T9 | | 1 | | | 1 | | | | 1 |
| F4 | T12 | T7 | 1 | | | | | | | 1 | 1 |
| F5 | T11 | T10 | 1 | | | | | 1 | 1 | | 1 |

Via-links: L80, L140, L161, L171, L191, L201, L210, L220

FIG. 18

| | Transmission terminal address | Reception terminal address | \multicolumn{8}{Via-links} | Quality flag |

| | Transmission terminal address | Reception terminal address | L80 | L140 | L161 | L171 | L191 | L201 | L210 | L220 | Quality flag |
|---|---|---|---|---|---|---|---|---|---|---|---|
| | Deterioration cause probability | | 0.001 | 0.001 | 0.001 | 0.1 | 0.001 | 0.1 | 0.001 | 0.001 | |
| F1 | T5 | T6 | | | 1 | | | | | | 1 |
| F2 | T2 | T9 | | | | | 1 | | | | 1 |
| F3 | T4 | T9 | | 1 | | | 1 | | | | 1 |
| F4 | T12 | T7 | 1 | | | | | | | 1 | 1 |
| F5 | T11 | T10 | 1 | | | | | 1 | 1 | | 1 |

FIG. 22

| | Transmission terminal address | Reception terminal address | L10 | L20 | L30 | L80 | L120 | L140 | L150 | L161 | L171 | L191 | L201 | L210 | L220 | L141 | Quality flag |
|---|---|---|---|---|---|---|---|---|---|---|---|---|---|---|---|---|---|
| F1 | T5 | T6 | 1 | 1 | 1 | | | | 1 | 1 | | | | | | | 0 |
| F2 | T2 | T9 | | 1 | 1 | 1 | | | | | | 1 | | | | | 0 |
| F3 | T4 | T9 | | 1 | | 1 | | 1 | | | | 1 | | | | | 0 |
| F4 | T12 | T7 | | | | | 1 | | | | 1 | | 1 | | 1 | | 0 |
| F5 | T11 | T10 | | | | 1 | | | | | | | 1 | 1 | | | 0 |
| F6 | T2 | T4 | 1 | | | | 1 | | | | | | | | | 1 | 0 |

Via-links: L10 – L220

Condition B applied: L10 (F1, F6) and L120 (F4, F6)

Condition A applied: L171 (F4), L201 (F4), L210 and L220 (F4)

FIG. 23

| | Transmission terminal address | Reception terminal address | L10 | L20 | L30 | L80 | L120 | L140 | L150 | L161 | L171 | L191 | L201 | L210 | L220 | L111 | L170 | L180 | L160 | Quality flag |
|---|---|---|---|---|---|---|---|---|---|---|---|---|---|---|---|---|---|---|---|---|
| F1 | T5 | T6 | 1 | 1 | | | | | 1 | | | | | | | | | | | 0 |
| F2 | T2 | T9 | | 1 | 1 | | | | | | | 1 | | | | | | | | 0 |
| F3 | T4 | T9 | | 1 | 1 | | | 1 | | | | 1 | | | | | | | | 0 |
| F4 | T12 | T7 | | | | | | | | | 1 | | 1 | 1 | 1 | | | | | 0 |
| F5 | T11 | T10 | | | | 1 | | | | | | | | 1 | | | | | | 0 |
| F6 | T2 | T4 | 1 | | | | 1 | | | | | | | | | | | | | 0 |
| TF1 | T2 | T1 | | | | | 1 | | | 1 | | | 1 | | | 1 | | | | 0 |
| TF2 | T7 | T6 | | | | | | | | | | | | | | 1 | 1 | | | 0 |
| TF3 | T8 | T10 | | | | | | | | | 1 | | | | | | | 1 | | 0 |
| TF4 | T6 | T7 | | | | | | | | | 1 | | | | | | | | 1 | 0 |

User flow: F1–F6  
Test flows: TF1–TF4  
Via-links: L10–L220

Condition B failed (L10, L120 region)  
Condition A failed (L150/L161, L171, L201 region)

DEVICE, METHOD, AND PROGRAM FOR ESTIMATING QUALITY-DETERIORATED AREA OF NETWORK

BACKGROUND OF THE INVENTION

1. Field of the Invention

The present invention relates to a communication network system and, more particularly, to a quality-deteriorated area estimating device and the like for estimating the deteriorated area in terms of communication quality.

2. Description of the Related Art

Conventionally, communication-quality deteriorated area has been specified in the following manner at a high speed when there is deterioration in the communication quality of a communication network. That is, a number of monitoring devices are provided within the network for constantly monitoring the communication quality at the positions where the monitoring devices are provided and, when the communication quality is deteriorated, a section with quality-deterioration is estimated according to the position of the monitoring device where the quality is deteriorated. This method requires a great number of monitoring devices for improving the estimation accuracy of the position where the quality is deteriorated. Therefore, it is costly to be provided with the devices.

The quality-deteriorated area estimating method disclosed in Japanese Patent Unexamined Publication 2002-271392 (METHOD OF CONTROLLING VOICE QUALITY FOR EVERY CALL IN IP NETWORK) finds the route of the quality-deteriorated flow based on quality information of communication flow of a network user and network topology, and specifies the common route section of a plurality of quality-deteriorated flows for estimating it as a quality-deteriorated area.

For example, let us assume that in a network as shown in FIG. 24 in which routers (or packet switches) R1-R6 and terminals T1-T6 are connected, flow F1 and flow F2 of the user flow through common route from R1 to R2, and there is deterioration of the quality occurred in the route from R1 to R2. In that case, the flows F1 and F2 are quality-deteriorated. The conventional quality-deteriorated area estimating method estimates the route section from R1 to R2, which is used in common by the quality-deteriorated flows F1 and F2, as the quality-deteriorated area.

However, when the routes of the quality-deteriorated flows are similar and there are a great number of common route sections, this method estimates all of them as the quality-deteriorated areas. Thus, this method has poor estimation accuracy and, in addition, may estimate a wrong section as the quality-deteriorated area when there are a plurality of quality-deteriorated areas.

Specifically, for example, let us assume that in a network as shown in FIG. 25 in which routers (or packet switches) R1-R6 and terminals T1-T7 are connected, flow F1 and flow F2 of the user flow trough common route from R1 to R4, and there is deterioration of the quality occurred in the route from R1 to R2 as a part of the common route. In this case, the flows F1 and F2 are quality-deteriorated. However, the conventional quality-deteriorated area estimating method estimates all the communication-route sections from R1 to R2, R2 to R3, and R3 to R4, which are shared by the quality-deteriorated flows F1 and F2, as the sections suspected of having quality deterioration. This estimation is not the actual quality-deteriorated section and, in addition, wider sections than the actual quality-deteriorated section are estimated as the quality deteriorated sections. Therefore, it has low estimation accuracy.

As another example of the same network structure, let us assume that, when the flows F1-F4 flow by partially sharing the communication route sections as shown in FIG. 26, there is quality deterioration occurred in the partial communication route from R1 to R2 and R3 to R4. In that case, the qualities of the flows F1, F2, F3, and F4 are deteriorated. In this state, there is no route section that is shared by all the quality-deteriorated flows F1, F2, F3, and F4, and the route sections partially shared by two or more flows are the route sections from R1 to R2, R2 to R3, and R3 to R4. The conventional quality-deteriorated section estimating method estimates the common route as the quality-deteriorated section. Thus, it concludes to estimate that "there is no section suspected of quality deterioration" or "the sections from R1 to R2, R2 to R3, and R3 to R4 are suspected of quality deterioration". However, the sections where the quality is actually deteriorated are the partially shared routes from R1 to R2 and R3 to R4. Therefore, the former estimation result is wrong and the latter estimation result is of poor accuracy.

SUMMARY OF THE INVENTION

An object of the present invention is to estimate the quality-deteriorated area with high precision according to flow quality information. Another object of the present invention is to estimate the quality-deteriorated area at a high speed.

In order to achieve the foregoing objects, the quality-deteriorated area estimating device according to a first aspect of the present invention comprises: a flow quality information collecting unit for collecting flow quality information including a transmitter address, receiver address, and communication quality of a flow flowing in a network; a route information collecting unit for collecting structure information of the network; a flow-quality/via-link table managing unit which, based on the flow quality information collected by the flow quality information collecting unit and the structure information of the network collected by the route information collecting unit, finds a link that the flow goes through, judges occurrence of quality deterioration in the flow, and manages a result thereof in a table form; and an estimating unit which estimates, among a subset of a set of links that an arbitrary flow with quality deterioration goes through, a subset including the link that the arbitrary flow with quality deterioration goes through, which also has a minimum number of elements, as a quality deteriorated area in the table managed by the flow-quality/via-link table managing unit.

Using the quality-deteriorated area estimating device according to a first aspect of the present invention, there are executed the steps of: a flow quality information collecting step for collecting flow quality information including a transmitter address, receiver address, and communication quality of a flow flowing in a network; an information collecting step for collecting structure information of the network; a managing step which, based on the flow quality information collected by the flow quality information collecting unit and the structure information of the network collected by the route information collecting unit, finds a link that the flow goes through, judges occurrence of quality deterioration in the flow, and manages a result thereof in a table form; and an estimating step which estimates, among a subset of a set of links that an arbitrary flow with quality deterioration goes through, a subset including the link that the arbitrary flow with quality deterioration goes through, which also has a minimum number of elements, as a quality deteriorated area when there is quality deterioration in one or more flow in the table managed by the flow-quality/via-link table managing unit.

As described above, regarding all the links that the flow being in actual communication is going through, among combinations of all the quality-deteriorated links with possibility of causing current communication quality deterioration, a combination with the minimum number of links is outputted as the quality-deteriorated area. On a reasonable assumption that the probabilities of each link of the network for being the cause of quality deterioration are equal and independent from each other, the output is the quality-deteriorated area that has the highest probability of causing the current communication quality deterioration. Thereby, highly accurate estimation can be achieved based on the flow quality information.

Further, the quality-deteriorated area estimating device according to a second aspect of the present invention comprises: a flow quality information collecting unit for collecting flow quality information including a transmitter address, receiver address, and communication quality of a flow flowing in a network; a route information collecting unit for collecting structure information of the network; a flow-quality/via-link table managing unit which, based on the flow quality information collected by the flow quality information collecting unit and the structure information of the network collected by the route information collecting unit, finds a link that the flow goes through, judges occurrence of quality deterioration in the flow, and manages a result thereof in a table form; a link-quality deteriorating probability storage unit for storing probability data of each link of the network for being a cause of past quality deterioration; and an estimating unit which determines, among a subset of a set of links that an arbitrary flow with quality deterioration goes through, a subset including the link that the arbitrary flow with quality deterioration goes through, which is also estimated as having highest probability of causing quality deterioration by using the probability data, and estimates the determined subset as a quality deteriorated area in the table managed by the flow-quality/via-link table managing unit.

Using the quality-deteriorated area estimating device according to a second aspect of the present invention, there may be executed the steps of: a flow quality information collecting step for collecting flow quality information including a transmitter address, receiver address, and communication quality of a flow flowing in a network; an information collecting step for collecting structure information of the network; a managing step which, based on the flow quality information collected by the flow quality information collecting unit and the structure information of the network collected by the route information collecting unit, finds a link that the flow goes through, judges occurrence of quality deterioration in the flow, and manages a result thereof in a table form; a storing step for storing probability data of each link of the network for being a cause of past quality deterioration; and an estimating step which determines, among a subset of a set of links that an arbitrary flow with quality deterioration goes through, a subset including a link that the arbitrary flow with quality deterioration goes through, which is also estimated as having highest probability of causing quality deterioration by using the probability data, and estimates the determined subset as a quality deteriorated area when there is quality deterioration in one or more flow in the table managed by the flow-quality/via-link table managing unit.

As described above, regarding all the links that the flow being in actual communication is going through, among combinations of all the quality-deteriorated links with possibility of causing current communication quality deterioration, a combination that is estimated as having the highest probability based on the probabilities of each link for being the cause of the past quality deterioration is outputted as the quality-deteriorated areas. Thereby, highly accurate estimation can be achieved based on the flow quality information even in the case where the probabilities of each link of the network for being the cause of the past quality deterioration defer largely from each other.

Further, the estimating unit of the quality-deteriorated area estimating device according to the first aspect of the present invention may be a structure that eliminates a link that a flow with fine quality goes through from the set of the links that the arbitrary flow with quality deterioration goes through and, among the subset of the set of the links after the elimination, estimates a subset including the link that the arbitrary flow with quality deterioration goes through, which also has the minimum number of elements, as the quality deteriorated area.

By using the estimating unit, there may be performed the processing, when there is quality deterioration in one or more flow, for eliminating a link that a flow with fine quality goes through from the set of the links that the arbitrary flow with quality deterioration goes through and, among the subset of the set of the links after the elimination, estimating a subset including the link that the arbitrary flow with quality deterioration goes through, which also has a minimum number of elements, as a quality deteriorated area.

As described above, after eliminating the link that the flow with fine quality goes through from all the links that the flow being actually in communication is going through, the quality-deteriorated area is estimated by the same method as the quality-deteriorated area estimating unit of the quality-deteriorated area estimating device according to the first aspect of the present invention. Elimination of the link that the flow with fine quality goes through allows reduction of the number of combinations of the links that may cause quality deterioration. Thus, it is possible to improve the estimation accuracy and increase the speed of estimating the quality-deteriorated area at the same time.

Further, the estimating unit of the quality-deteriorated area estimating device according to the second aspect of the present invention may be a structure that eliminates a link that a flow with fine quality goes through from the set of the links that an arbitrary flow with quality deterioration goes through and, among the subset of the set of the links after the elimination, estimates a subset including the link that the arbitrary flow with quality deterioration goes through, which is also estimated as having highest probability of causing quality deterioration based on probability of being a cause for past quality deterioration, as a quality deteriorated area.

By using the estimating unit, there may be performed the processing, when there is quality deterioration in one or more flow, for eliminating a link that a flow with fine quality goes through from the set of the links that the arbitrary flow with quality deterioration goes through, and estimating a subset including the link that the arbitrary flow with quality deterioration goes through among the subset of the set of the links after the elimination, which is also estimated as having highest probability of causing quality deterioration based on probability of being a cause for past quality deterioration, as a quality deteriorated area.

As described above, after eliminating the link that the flow with fine quality goes through from all the links that the flow actually in communication is going through, the quality-deteriorated area is estimated by the same method as the quality-deteriorated area estimating unit of the quality-deteriorated area estimating device according to the second aspect of the present invention. Elimination of the link that the flow with fine quality goes through allows reduction of the number of combinations of the links that may cause quality deterioration. Thus, it is possible to improve the estimation accuracy and increase the speed of estimating the quality-deteriorated area at the same time.

The flow quality information collecting unit of the quality-deteriorated area estimating device according to the first aspect comprises a function of collecting flow quality information that includes transmitter addresses, receiver addresses, and communication qualities of flows including a network user flow and a test flow; the flow-quality/via-link table managing unit comprises functions of, based on the flow quality information collected by the flow quality information collecting unit and the structure information of the network collected by the route information collecting unit, finding a link that the flow goes through, judging occurrence of quality deterioration in the flow, managing a result thereof in a table, and determining a route for the test flow to flow in depending on a route of the user flow; and the estimating unit comprises functions of eliminating a link that a flow with fine quality goes through from the set of the links that an arbitrary flow with quality deterioration goes through, and estimating a subset including the link that the arbitrary flow with quality deterioration goes through among the subset of the set of the links after the elimination, which is also has the minimum number of elements, as a quality deteriorated area in the table managed by the flow-quality/via-link table managing unit.

By using the flow quality information collecting unit of the quality-deteriorated area estimating device according to the first aspect, the quality information collecting step may perform processing for collecting the flow quality information including the transmitter address, receiver address, and communication quality of the flow including a network user flow and a test flow; the managing step may perform processing, based on the flow quality information collected by the flow quality information collecting unit and the structure information of the network collected by the route information collecting unit, for finding the link that the flow goes through, judging occurrence of quality deterioration in the flow, managing the result thereof in the table, and determining the route for the test flow to flow in depending on the route of the user flow; and the estimating step may perform processing for eliminating the link that the flow with fine quality goes through from the set of the links that the arbitrary flow with quality deterioration goes through and, among the subset of the set of the links after the elimination, estimating the subset including the link that the arbitrary flow with quality deterioration goes through, which also has the minimum number of elements, as a quality deteriorated area when there is quality deterioration in one or more flow in the table managed by the flow-quality/via-link table managing unit.

As described above, the flow quality information collecting unit gives a command to the terminal to generate the test flow. Thus, the quality-deteriorated area estimating unit eliminates the link that the flow with fine quality goes through from all the links that the currently communication flows, including the test flow, go through. Then, the estimating unit estimates the quality-deteriorated area by the same method as the quality-deteriorated area estimating unit of the quality-deteriorated area estimating device according to the first aspect of the present invention. The route of the test flow is determined to improve the estimation accuracy depending on the route of the network user flow. Therefore, the estimation accuracy can be improved. Furthermore, when the flow necessary for improving the estimation accuracy has already been flown by the network user, the test flow is not flown therethrough. Therefore, it is possible to reduce the amount of using the network by the test flow.

The flow-quality/via-link table managing unit of the quality-deteriorated area estimating device according to the first aspect may be a structure that comprises a function of determining the route for the test flow to flow in depending on the route of the flow flown by the network user such that, regarding an arbitrary user flow, the user flow does not share two or more sections of links with other flow, and that arbitrary two or more flows including at least one user flow do not share two or more sections of links exclusively by those flows.

By using the flow-quality/via-link table managing unit, there may be performed processing for determining the route for the test flow to flow in depending on the route of the flow flown by the network user such that, regarding an arbitrary user flow, the user flow does not share two or more sections of links with other flow, and that arbitrary two or more flows including at least one user flow do not share two or more sections of links exclusively by those flows.

The route for the test flow to flow in is determined such that, regarding an arbitrary user flow, the user flow does not share two or more sections of links with other flow, and that arbitrary two or more flows including at least one user flow do not share two or more sections of links exclusively by those flows. Therefore, when there is quality deterioration caused in an arbitrary area of the link on the routes that the user flow flows in, the position thereof can be estimated correctly. Thereby, it is possible to improve the estimation accuracy of the quality-deteriorated area.

In the present invention, regarding all the links that the flow being in actual communication is going through, among combinations of all the quality-deteriorated links with possibility of causing current communication quality deterioration, a combination with the minimum number of links or a combination that is estimated as having the highest probability based on the probabilities of each link for being the cause of the past quality deterioration is outputted as the quality-deteriorated area. Thereby, highly accurate estimation can be achieved based on the flow quality information.

BRIEF DESCRIPTION OF THE DRAWINGS

FIG. 6 is a chart for showing an example of flow-quality/via-link table according to the first embodiment of the present invention;

FIG. 10 is a chart for showing an example of quality deterioration cause probability table according to the second embodiment of the present invention;

FIG. 12 is a chart showing the flow-quality/via-link table according to the second embodiment, to which the quality deterioration cause probabilities for each via-link are also written in;

FIG. 15 is a chart for showing an example of flow-quality/via-link table according to the third embodiment of the present invention;

FIG. 16 is a chart for showing an example of flow-quality/via-link table according to the third embodiment of the present invention after eliminating the quality-deteriorated link;

FIG. 18 is a chart showing the flow-quality/via-link table according to the fourth embodiment after eliminating the quality-deteriorated link, to which the quality deterioration cause probabilities for each via-link are also written in;

FIG. 22 is a chart for showing an example of flow-quality/via-link table according to the fifth embodiment of the present invention;

FIG. 23 is a chart for showing an example of flow-quality/via-link table according to the fifth embodiment of the present invention after adding the test flows;

DETAILED DESCRIPTION OF THE PREFERRED EMBODIMENTS

In the followings, embodiments of the present invention will be described in detail by referring to the accompanying drawings.

First Embodiment

Figure 1:
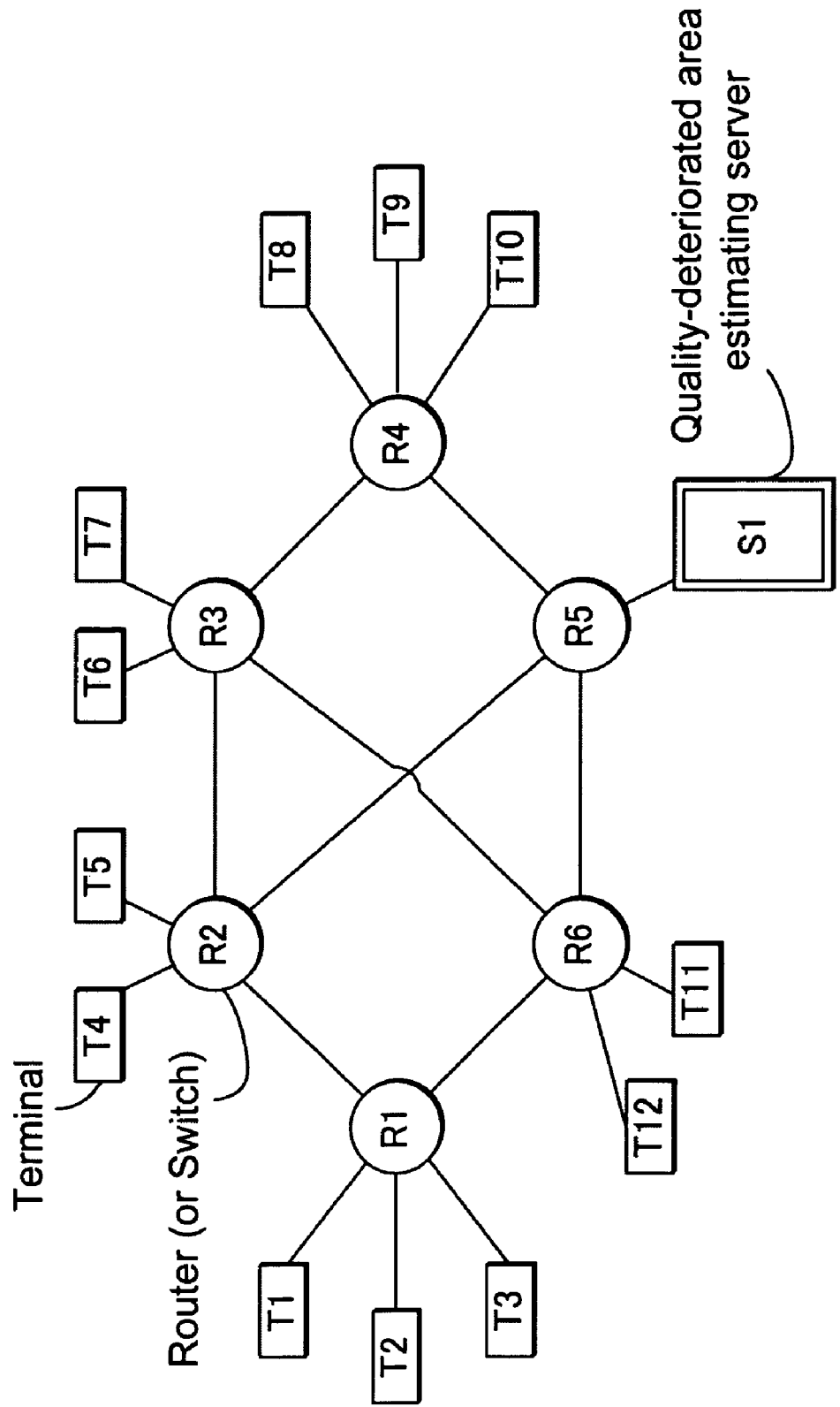
FIG. 1 is a block diagram for showing an example of a network structure used in the present invention.

As shown in FIG. 1, in a network according to a first embodiment of the present invention, routers (or switches) R1-R6 are disposed, terminals T1-T12 are connected to the respective routers R1, R2, R3, R4, R6 as appropriate, and a quality-deteriorated area estimating server S1 is connected to the router R5.

Figure 2:
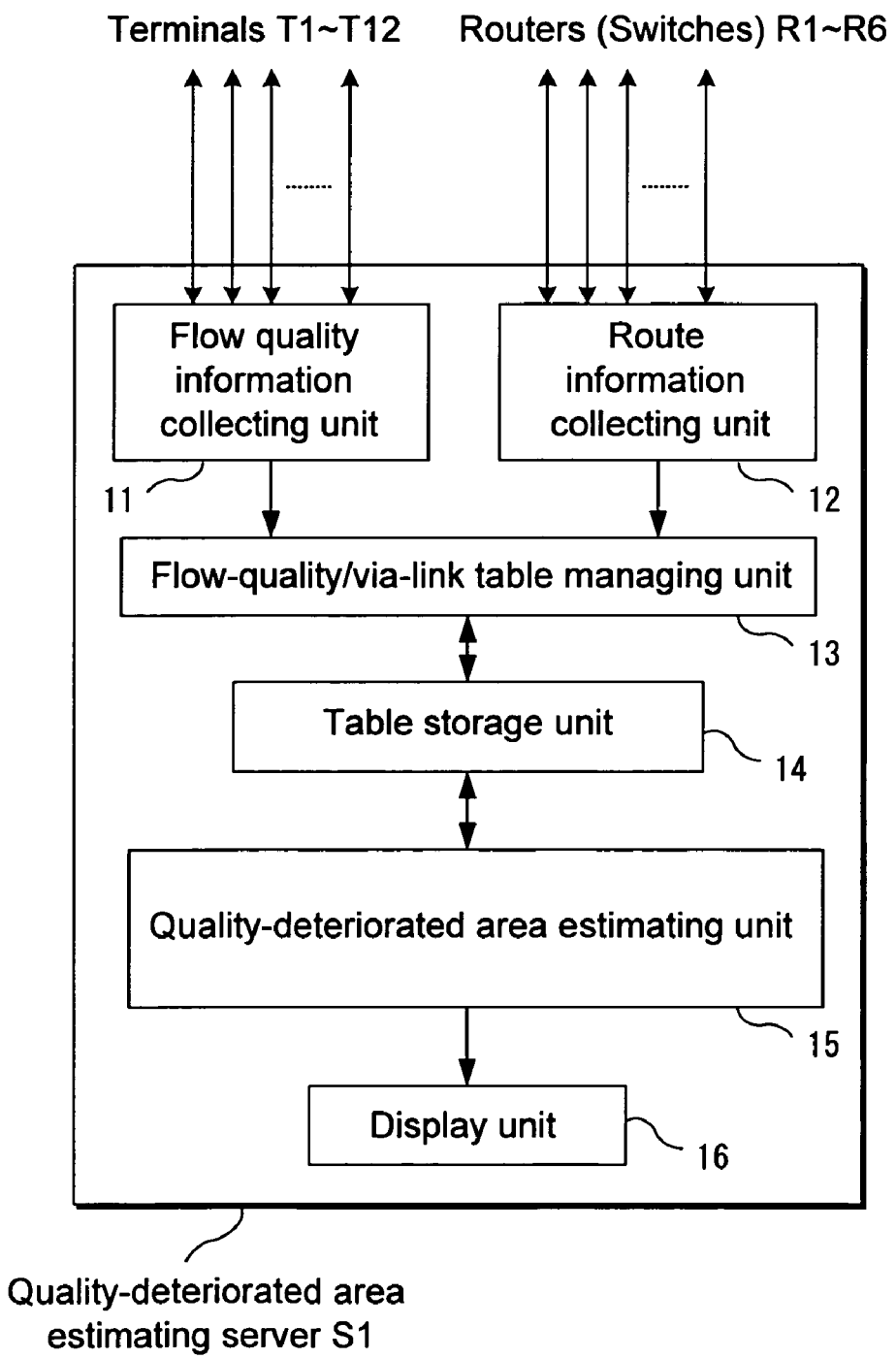
FIG. 2 is a block diagram for showing a structural example of a quality-deteriorated area estimating server according to a first embodiment of the present invention.

As shown in FIG. 2, the quality-deteriorated area estimating server S1 constitutes a quality-deteriorated area estimating device according to the embodiments of the present invention. The quality-deteriorated area estimating server S1 comprises: a flow quality information collecting unit 11, a route information collecting unit 12, a flow-quality/via-link table managing unit 13, a table storage unit 14, a quality-deteriorated area estimating unit (referred to as an estimating unit hereinafter) 15, and a display unit 16.

The flow quality information collecting unit 11 has a function of collecting flow quality information including a transmitter address, a receiver address, and communication quality of a flow flown by a network user. The route information collecting unit 12 has a function of collecting information of the network structure. The flow-quality/via-link table managing unit 13 has functions of: judging the occurrence of quality deterioration by finding a link that the flow goes through based on the flow quality information from the flow quality information collecting unit 11 and the information of the network structure from the route information collecting unit 12; and managing those pieces of information in a table format. The table storage unit 14 has a function of receiving the flow-quality/via-link table managed by the flow quality information collecting unit 11 and storing the information. The estimating unit 15 has a function of outputting, as the quality-deteriorated area, a subset that includes the link that an arbitrary flow with deteriorated quality goes through, which also has the minimum number of elements, among the subset of the set of links that the arbitrary flow with deteriorated quality goes through, when there is quality deterioration in one or more flow detected in the table that is managed by the flow-quality/via-link table managing unit 13. The display unit 16 has a function of displaying the result estimated by the estimating unit 15 as a visible image towards the outside. The display unit 16 may print out the result estimated by the estimating unit 15.

Next, there is described a method for estimating the quality-deteriorated area using the quality-deteriorated area estimating server S1 according to the embodiment of the present invention shown in FIG. 2.

When the terminal starts communication, the flow quality information collecting unit 11 receives a signal for indicating start of communication from the terminal. After receiving the communication start signal, the flow quality information collecting unit 11 collects the current communication quality information of the terminal regularly from the terminal. The communication quality information contains a transmitter address (address of transmission terminal), a receiver address (address of reception terminal), and communication quality information of a flow flown by a network user (terminal). The communication quality information herein is information regarding packet loss rate, burst characteristic of the packet loss, reception rate, delay, delay jitter, etc.

When the terminal ends the communication, a signal of communication end is outputted from the terminal, and the flow quality information collecting unit 11 receives the signal of the communication end.

The route information collecting unit 12 collects information (information of the network structure) regarding the routing from the routers (or switches) R1-R6. The route information collecting unit 12 can collect the information regarding the routing using SMTP (Simple Network Management Protocol) and the like. With the information regarding the routing, it is possible to determine which route the communication between the transmission and reception terminals is performed through based on the address information of the transmission and reception terminals. Specifically, the routing information collected from the routers is the structural information of the routing table and the ARP table. The routing information collected form the switches is the structural information of forwarding database and spanning tree. The information can be supplied to the route information collecting unit 12 by a network supervisor instead of collecting it from the routers (or switches) R1-R6.

When the flow quality information collecting unit 11 collects the communication quality information and the route information collecting unit 12 collects the information regarding the routing, the flow-quality/via-link table managing unit 13 receives the flow quality information obtained from the flow quality information collecting unit 11 and receives the routing information from the route information collecting unit 12 at the same time. Then, based on the flow quality information and the routing information, the flow-quality/via-link table managing unit 13 finds the link that the flow of current communication goes through, determines the occurrence of quality deterioration in the flow, and manages the result in a table. The table is a flow-quality/via-link table constituted of addresses of the transmission and reception terminals, a set of links that the flow being in actual communication goes through, and quality flags indicating fine/poor state of the current communication quality of the flow.

Figure 3:
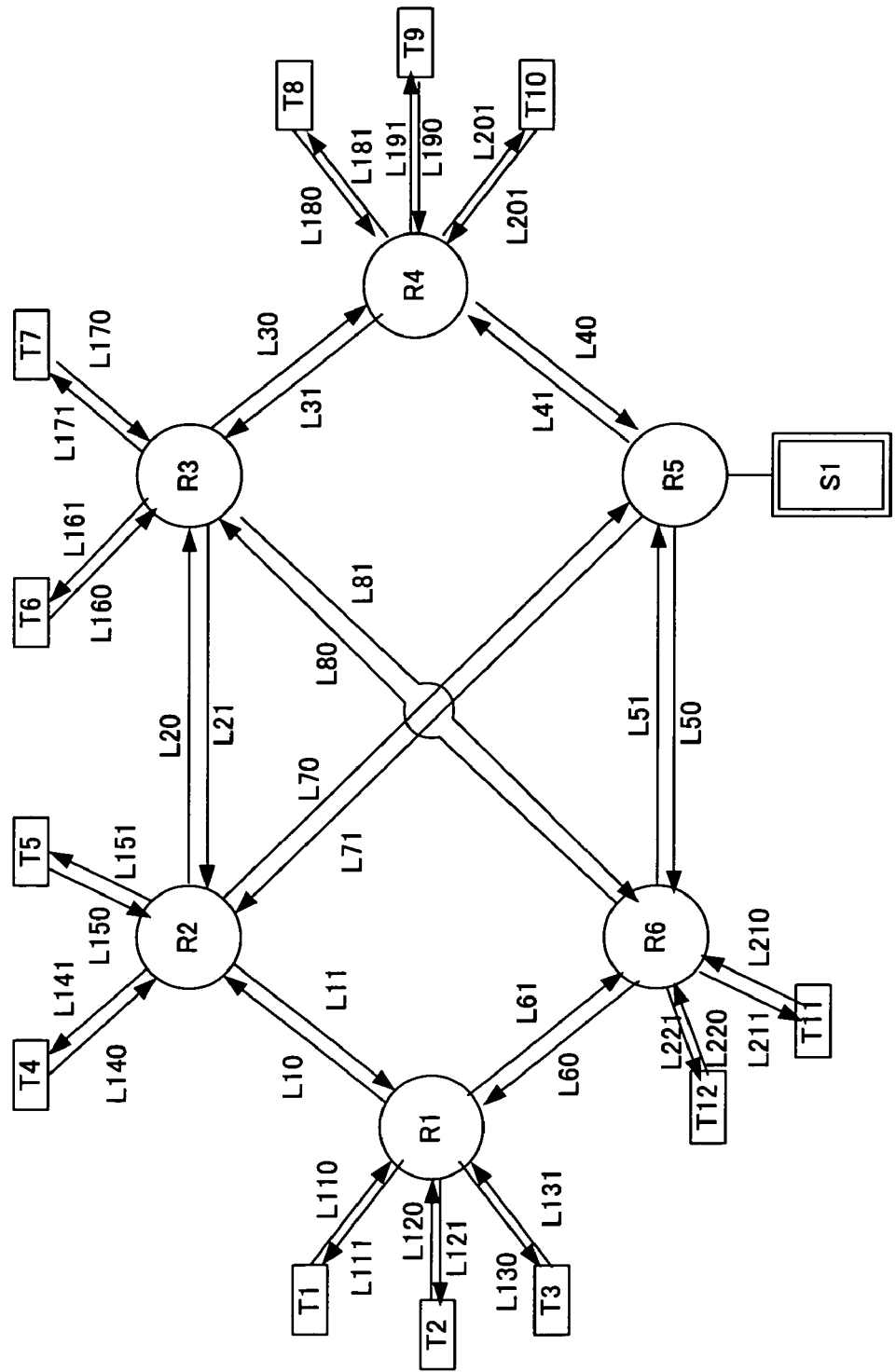
FIG. 3 is a block diagram for showing links of a network structure example used in the present invention.

The link means the effective link between routers (or switches) and between the router (or the switch) and the terminal. Specifically, in the case of the network structure as shown in FIG. 1, for example, the links mean the effective links such as L10, L11, L20, L21, - - - L220, L221 as shown in FIG. 3.

The flow-quality/via-link table managing unit 13 finds the quality indicator from the information (packet loss rate, burst characteristic of the packet loss, reception rate, delay, delay jitter, etc.) contained in the communication quality information of the flow quality information, and judges the quality deterioration of the flow in accordance with the fact whether or not the quality indicator is more than a deterioration threshold value that is supplied in advance. If the quality indicator is more than the deterioration threshold value (deteriorated), the quality flag is set as "1". If the quality indicator is less than the fine threshold value supplied in advance, the quality flag is set as "0". If the quality flag is neither "1" nor "0", the quality flag is set as indefinite (referred to as "N/A" hereinafter). By way of example, one (for example, packet loss rate) of the communication quality information may simply be used. For VoIp flow, R-value may be obtained from the packet loss rate, delay jitter, etc. according to G. 107 E-Model recommended by ITU-T, which may be used as the quality indicator.

Figure 4:
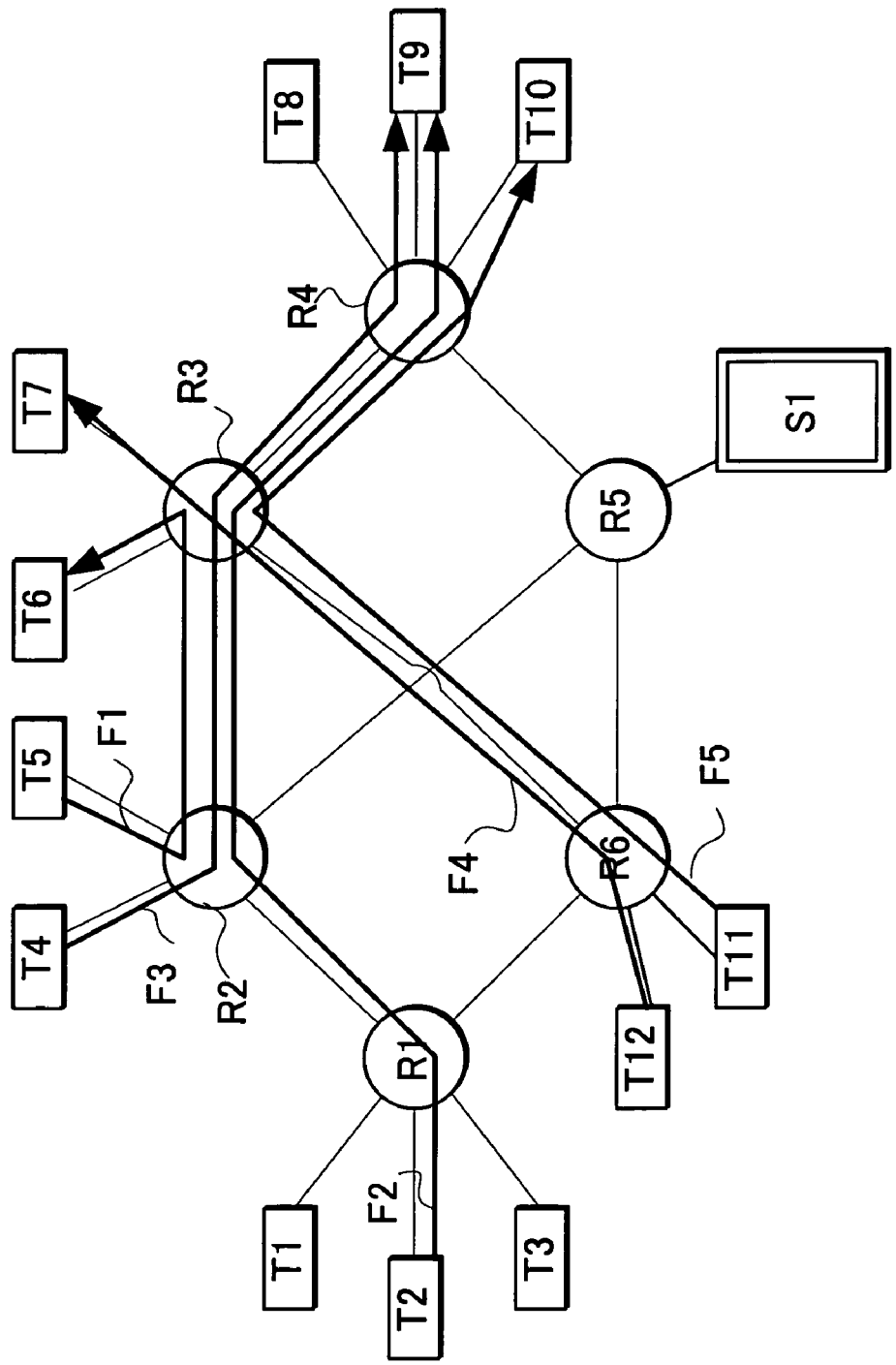
FIG. 4 is a block diagram for showing an example of flows according to the first embodiment of the present invention.
Figure 5:
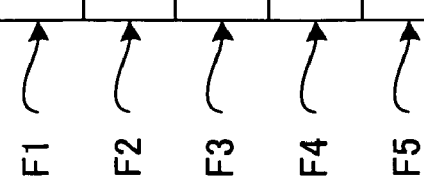
FIG. 5 is a chart for showing an example of flow quality information according to the first embodiment of the present invention.

For example, let us assume that flows F1-F5 flow as shown in FIG. 4 in the network structure of FIG. 1, and content of the current flow quality information of the flows F1-F5 is as shown in FIG. 5. When the packet loss rate is used as the quality indicator and the deterioration threshold value is 1%, the flow-quality/via-link table managed by the flow-quality/via-link table managing unit 13 has the content shown in FIG. 6.

Figure 7:
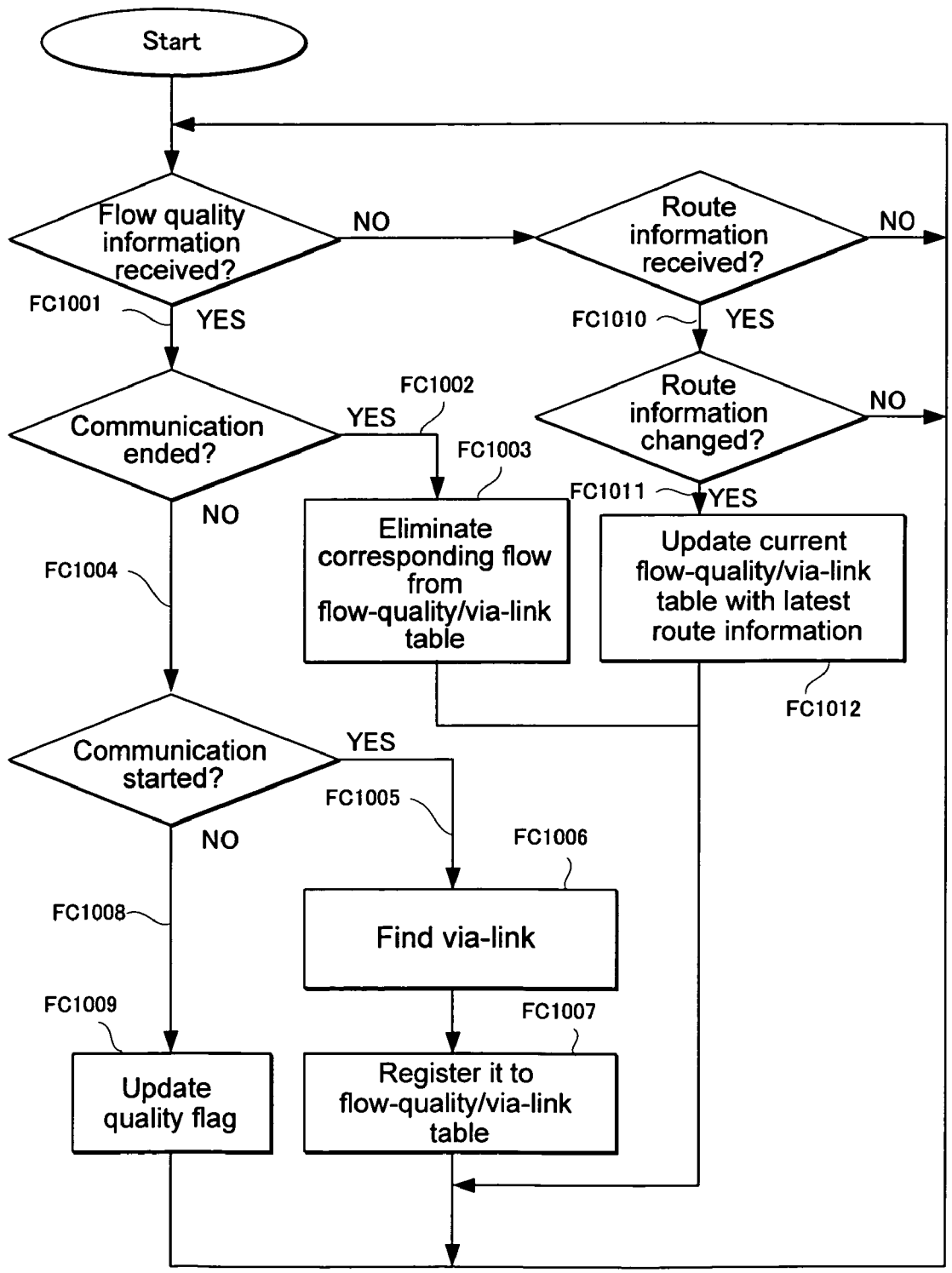
FIG. 7 is a flowchart for showing action of a flow-quality/via-link table managing unit according to the first embodiment of the present invention.

Next, action of the flow-quality/via-link table managing unit 13 will be described more specifically by referring to FIG. 7. When receiving the flow quality information from the flow quality information collecting unit 11 (FC1001) and if the received information is the information indicating communication end of the terminal (FC1002), the flow-quality/via-link table managing unit 13 eliminates the corresponding flow from the flow-quality/via-link table (FC1003). When the received information is not the information indicating the communication end of the terminal (FC1004) but the information indicating the communication start of the terminal (FC1005), the flow-quality/via-link table managing unit 13 obtains the information regarding the current routing from the route information collecting unit 12, finds the via-link (FC1006) from the flow quality information (particularly, from the address of the transmission terminal and the address of the reception terminal), determines the quality flag from the communication quality information of the flow quality information, and registers it to the flow-quality/via-link table (FC1007). When the received information is not the information indicating the communication start of the terminal (FC1008), it is also the information notifying the latest communication quality of the flow that is currently registered. Thus, the quality flag is determined based on the communication quality information of the flow quality information and the communication flag of the flow-quality/via-link table is updated (FC1009). When receiving the route information from the route information collecting unit 12 (FC1010) and if there is a change in the route information (FC1011), the flow-quality/via-link table managing unit 13 determines the via-links of all the flows registered to the current flow-quality/via-link table based on the information of the table (particularly, from the address of the transmission terminal and the address of the reception terminal) and the information regarding the current routing (after the change), and updates the flow-quality/via-link table (FC1012).

The information of the flow-quality/via-link table managed by the flow-quality/via-link table managing unit 13 is stored in the table storage unit 14.

The quality-deteriorated area estimating unit 15 reads out the flow-quality/via-link table regularly from the table storage unit 14. When there is a flow with the quality flag of "1", the estimating unit 15 estimates the quality-deteriorated area using a minimum-link-number estimating method and outputs the result to the display unit 16.

Figure 8:
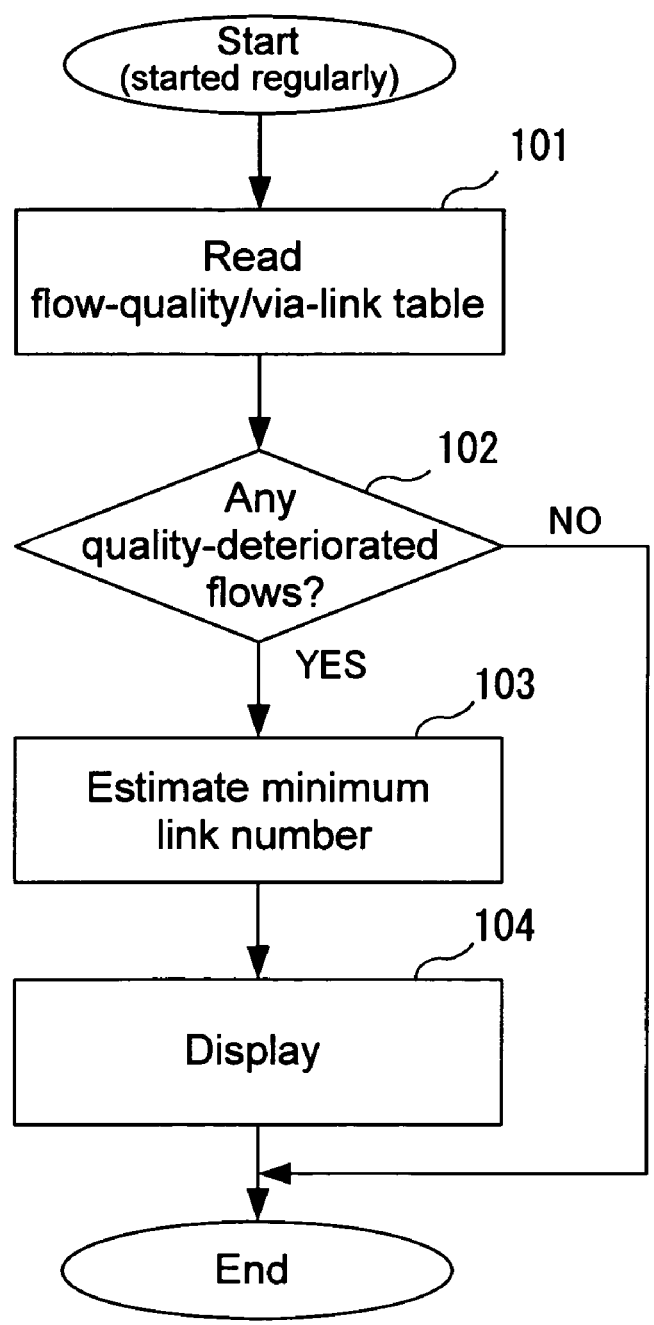
FIG. 8 is a flowchart for showing action of a quality-deteriorated area estimating unit according to the first embodiment of the present invention.

Next, action of the estimating unit 15 will be described more specifically by referring to FIG. 8. First, there will be described the prerequisites of the minimum-link-number estimating method that is used when the estimating unit 15 estimates the quality-deteriorated area.

First, for the columns of the via-links in the flow-quality/via-link table, a set of flows with the quality flag of "1" is referred to as a set of flows belonging to the columns of the via-links. For example, in the case of the flow-quality/via-link table shown in FIG. 6, a flow set belonging to the via-link L20 is constituted of {F1, F2, F3}. Further, a joined set of the flow sets respectively belonging to columns of a plurality of via-links is also referred to as a flow set belonging to those sets of the via-link columns. For example, in the case of the flow-quality/via-link table shown in FIG. 6, the set of the flows belonging to the set of link columns {L10, L30, L80} is {F2, F3, F4, F5}.

Next, there is described the case where the estimating unit 15 estimates the quality-deteriorated area using the minimum-link-number estimating method. The estimating unit 15 reads the flow-quality/via-link table stored in the table storage unit 14 (step 101), and extracts only the flow with the quality flag of "1" from the table (step 102). Subsequently, the flow set belonging to the set of via-link columns, which is constituted of the minimum number of elements, is selected from the set of the via-link columns that are identical to the flows extracted in the step 102 (step 103). Then, the via-link set (may be a plurality of sets) obtained in the step 103 is outputted as the result (step 104).

It will be described more specifically by referring to FIG. 6. By way of example, there will be described the case where the minimum-link-number estimating method is executed for the flow-quality/via-link table shown in FIG. 6. The quality flags are "1" in all the rows of this table so that the estimating unit 15 extracts all the flows {F1, F2, F3, F4, F5} in the step 102.

Then, when shifted to the step 103, the estimating unit 15 performs the next processing. In FIG. 6, the set of links having the flow set {F1, F2, F3, F4, F5} belonging to the set of the via-link columns may be {L20, L80}, {L30, L150, L171}, - - - etc. However, the set of links with the minimum number of elements is only the set of {L20, L80}. In the case of the embodiment, the minimum number of elements is "2".

Since the flows with the quality deterioration are {F1, F2, F3, F4, F5}, in the step 103, the estimating unit 15 estimates, among the set of the links that the set of the deteriorated flows {F1, F2, F3, F4, F5} goes through, the link set {L20, L80} with the minimum number of elements, which is also in the subset {L20, L80}, {L30, L150, L171}, {L150, L191, L220} - - - containing the links that the quality deteriorated flows {F1, F2, F3, F4, F5} go through, as the quality-deteriorated area, and outputs the estimated information to the display unit 16. In the step 103, it is possible for the estimating unit 15 to estimate the set of links with the minimum number of elements as the quality-deteriorated area using algorithm of a minimum covering problem instead of the minimum-link-number estimating method.

In the step 104, when the set of links {L20, L80} with the minimum number of elements is outputted as the result of executing the minimum-link-number estimating method, the display unit 16 displays, as the visible information, the estimated information of the quality-deteriorated area outputted from the estimating unit 15.

As described above, the embodiment enables highly accurate estimation of the quality-deteriorated area when the probabilities of causing the flow quality deterioration are about the same for each link and the links are independent from each other. The reason is as follows. That is, it is considered that, when a certain via-link has quality deterioration, the flow with the quality flag of "1" in column of the via-link on the flow-quality/via-link table causes quality deterioration. Therefore, the flows belonging to the set of the via-links are considered to be the set of flows that cause quality deterioration when the set of via-links have the quality deterioration simultaneously. Thus, the minimum-link-number estimating method is used to estimate the link set with the least number of elements (number of links) among all the sets of the quality-deteriorated links that may induce the current state of quality deterioration. When the probability of casing quality deterioration of the flow for each link is about the same, e.g. the probability p ($0 \leq p \leq 1$), and the links are independent from each other, the probability for k-number of links to cause quality deterioration simultaneously is $P^k$ (P to the power of k), and the larger k is, the smaller the probability becomes. In other words, the minimum-link-number estimating method is to find the pattern with the highest generating probability among all the patterns of the quality-deterioration causes that may induce the state of current quality deterioration. On this account, it is considered that the quality-deteriorated area is estimated in the best way when the probabilities of casing quality deterioration of the flow for each link are about the same and the links are independent from each other.

Second Embodiment

A second embodiment according to the present invention is different from the first embodiment of the present invention only in terms of the internal structure of the quality-deteriorated area estimating server S1 and the action of the quality-deteriorated area estimating unit. Therefore, only the different structures will be described.

Figure 9:
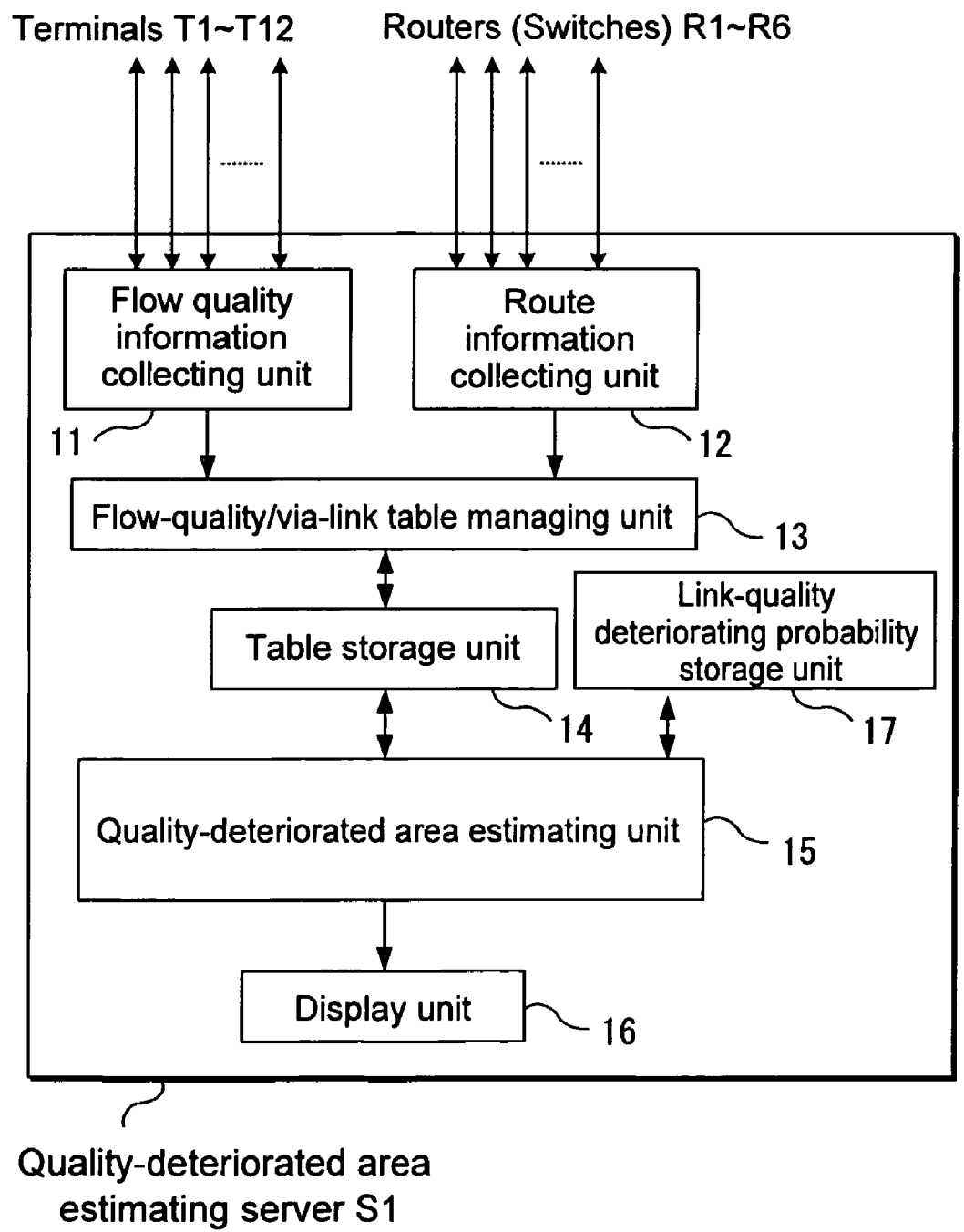
FIG. 9 is a block diagram for showing a structural example of a quality-deteriorated area estimating server according to a second embodiment of the present invention.

As shown in FIG. 9, in the quality-deteriorated area estimating server S1 according to the second embodiment of the present invention, the quality-deteriorated area estimating unit (referred to as the estimating unit hereinafter) of the quality-deteriorated area estimating server S1 shown in FIG. 2 comprises a link-quality deteriorating probability storage unit 17, so that information is exchanged between the link-quality deteriorating probability storage unit 17 and the estimating unit 15.

The link-quality deteriorating probability storage unit 17 stores a quality deterioration cause probability table shown in FIG. 10, in which each link within the network is corresponded to the probability for being the causes of the communication quality deterioration occurred in the past. The aforementioned link means the effective link described in the first embodiment.

In the followings, there will be described only the action of the estimating unit 15, which is different from that of the first embodiment. It is different from the first embodiment in respect that the estimating unit 15 estimates the quality-deteriorated area by using a highest probability estimating method instead of the minimum-link-number estimating method based on the information from the link-quality deteriorating probability storage unit 17.

The estimating unit 15 reads out the flow-quality/via-link table regularly from the table storage unit 14. When there is the flow with the quality flag of "1" found in the table, the estimating unit 15 estimates the quality-deteriorated area by using the highest probability estimating method and outputs the result to the display unit 16. The action of the estimating unit 15 is shown by a flowchart in FIG. 11.

Now, the highest probability estimating method will be described. First, for the columns of the via-links in the flow-quality/via-link table, a set of flows with the quality flag of "1", i.e. the set of flows with quality deterioration, is referred to as a flow set belonging to the columns of the via-links. For example, in the case of the flow-quality/via-link table shown in FIG. 6, a flow set belonging to the via-link column L20 is constituted of {F1, F2, F3}. Further, a joined set of the flow sets respectively belonging to columns of a plurality of via-links is also referred to as a flow set belonging to those sets of the via-link columns. For example, in the case of the flow-quality/via-link table shown in FIG. 6, the flow set belonging to the set of link columns {L10, L30, L80} is {F2, F3, F4, F5}. Furthermore, the estimated generating probability of the set of the link columns means the information that is the multiplication of the probabilities of each link for being the cause of quality deterioration, which are stored in the link-quality deteriorating probability storage unit 17.

The highest probability estimating method will now be described more specifically. First, the estimating unit 15 reads the flow-quality/via-link table stored in the table storage unit 14 (step 201 of FIG. 11), and extracts only the flow with the quality flag of "1" from the table (step 202 of FIG. 11).

Subsequently, the estimating unit 15 selects (step 203 of FIG. 11) the set of the via-link columns with the maximum estimated generating probability among the sets of via-link columns having the set of flows which are identical to the flows extracted in the step 202 belonging thereto.

Figure 11:
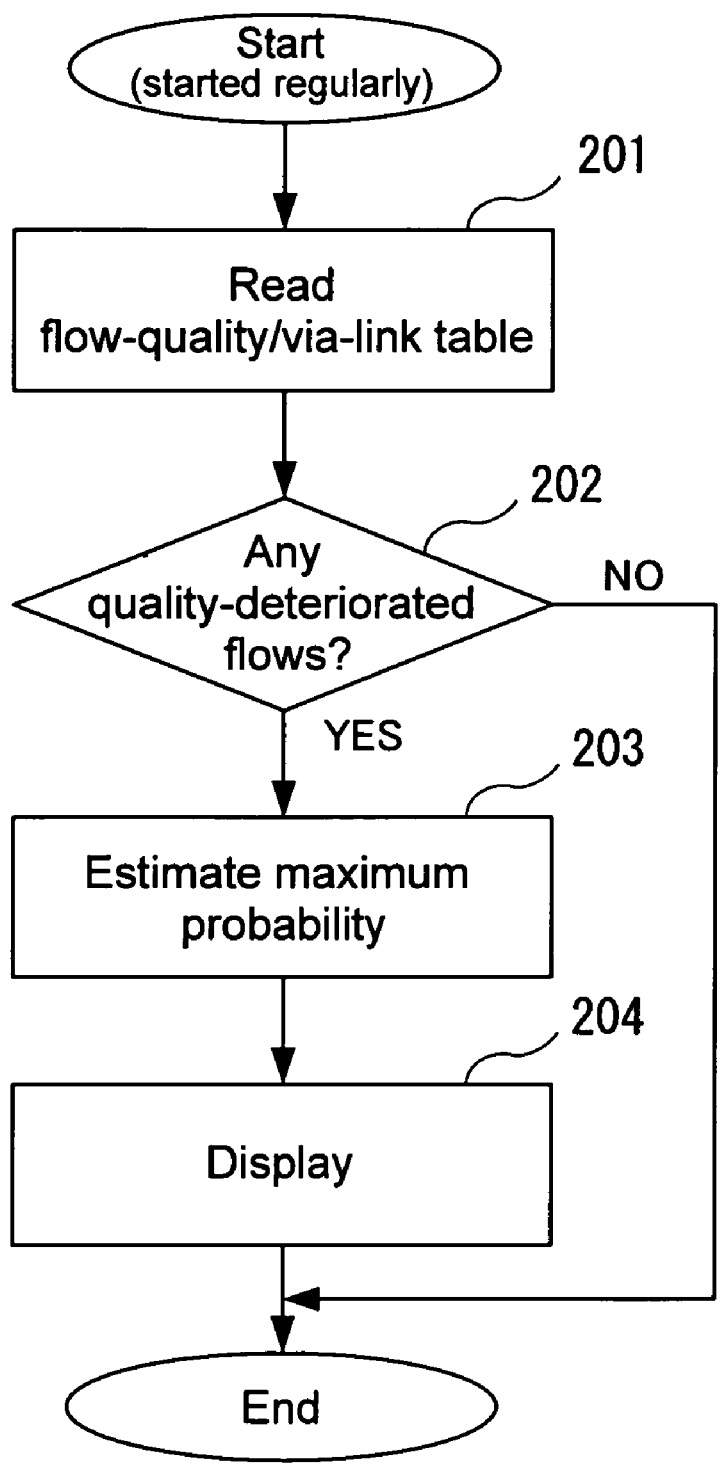
FIG. 11 is a flowchart for showing action of a quality-deteriorated area estimating unit according to the second embodiment of the present invention.

At last, the estimating unit 15 outputs the via-link set (may be a plurality of sets) obtained in the step 203 to the display unit 16 as the result (step 204 of FIG. 11).

There will be described the case where the highest probability estimating method is executed for the flow-quality/via-link table shown in FIG. 6. The quality flags are "1" in all the rows of this table so that the estimating unit 15 extracts all the flows {F1, F2, F3, F4, F5} in the step 202. For describing the step 203, FIG. 12 shows the flow-quality/via-link table of FIG. 6 to which the table containing the quality deterioration cause probability for each link, which is stored in the link-quality deteriorating probability storage unit 17, is also written in.

When the estimating unit 15 executes the processing of the step 203, the sets of links having the set of flows {F1, F2, F3, F4, F5} belonging thereto are {L20, L80}, {L30, L150, L171} - - -, etc. The estimated generating probabilities are 0.00001, 0.0005, - - - , respectively, and the set with the highest probability of causing quality deterioration is {L30, L150, L171}.

Since the flows with the quality deterioration are {F1, F2, F3, F4, F5}, in the step 203, the estimating unit 15 determines, among the set of the links that the set of the deteriorated flows {F1, F2, F3, F4, F5} goes through, the subset estimated as having the highest generating probability, which is also in the subset {L20, L80}, {L30, L150, L171}, - - - containing the links that the quality deteriorated flows {F1, F2, F3, F4, F5} go through, by using the information of the probabilities {0.00001, 0.0005, - - - } stored in the link-quality deteriorating probability storage unit 17. The estimating unit 15 estimates the determined subset {L30, L150, L171} as the quality-deteriorated areas and outputs the estimated information to the display unit 16. That is, in the step 204, {L30, L150, L171} is outputted as the result of the highest probability estimating method.

As described above, the embodiment enables highly accurate estimation of the quality-deteriorated area when the probabilities of causing the flow quality deterioration for each link are independent from each other. The reason is as follows. That is, it is considered that, when a certain via-link has quality deterioration, the flow with the quality flag of "1" in column of the via-link on the flow-quality-via-link table causes quality deterioration. Therefore, the flows belonging to the set of the via-links are considered to be the set of flows that cause quality deterioration when the set of via-links have the quality deterioration simultaneously. The highest probability estimating method selects the link set with the highest generating probability among all the sets of the quality-deteriorated links which may induce the current state of the quality deterioration based on the probabilities of each link for being the cause of deteriorating the quality at the time of the quality deterioration occurred in the past.

Third Embodiment

A third embodiment according to the present invention is different from the first embodiment of the present invention only in terms of the action of the quality-deteriorated area estimating unit (referred to as the estimating unit hereinafter) 15 of the quality-deteriorated area estimating server S1. Therefore, only the different structures will be described.

The estimating unit 15 according to the third embodiment of the present invention reads out the flow-quality/via-link table regularly from the table storage unit 14. When there is a flow with the quality flag of "1", the estimating unit 15 eliminates the quality-not-deteriorated link at first, then estimates the quality-deteriorated area using the minimum-link-number estimating method, and outputs the result to the display unit 16. Action of the estimating unit 15 will be described by referring to FIG. 13.

Figure 14:
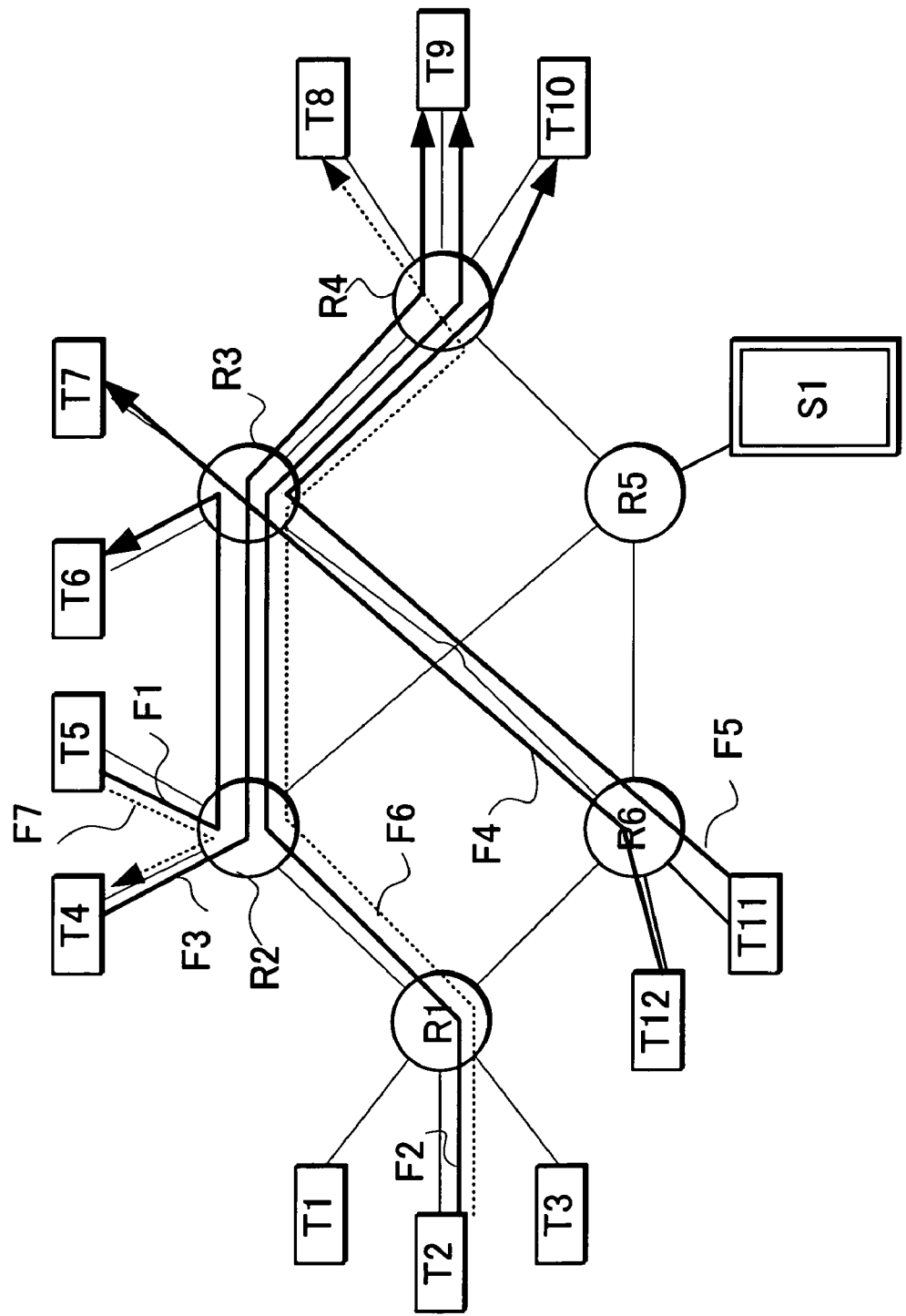
FIG. 14.*is* a block diagram for showing an example of flows according to the third embodiment of the present invention.

Elimination of the quality-non-deteriorated link means to eliminate the link, which is in a row of the flow with the quality flag of "0" and has the quality flag of "1" in the via-link section. By way of example, let us look at the case where, in addition to the illustrated example of the first embodiment, new flows F6 and F7 shown by dotted arrows are flown as shown in FIG. 14. It is assumed herein that the current flow-quality/via-link table regarding the flows F1-F7 has the content shown in FIG. 15. The flows F6 and F7 are flows with fine quality, i.e. the quality flag is "0", and it is considered the links L120, L10, L20, L30, L181, L150, L141 that the flows go through have no quality deterioration. FIG. 16 shows the table where the links {L120, L10, L20, L30, L181, L150, L141}, which the flows with fine quality go through, are eliminated.

Figure 13:
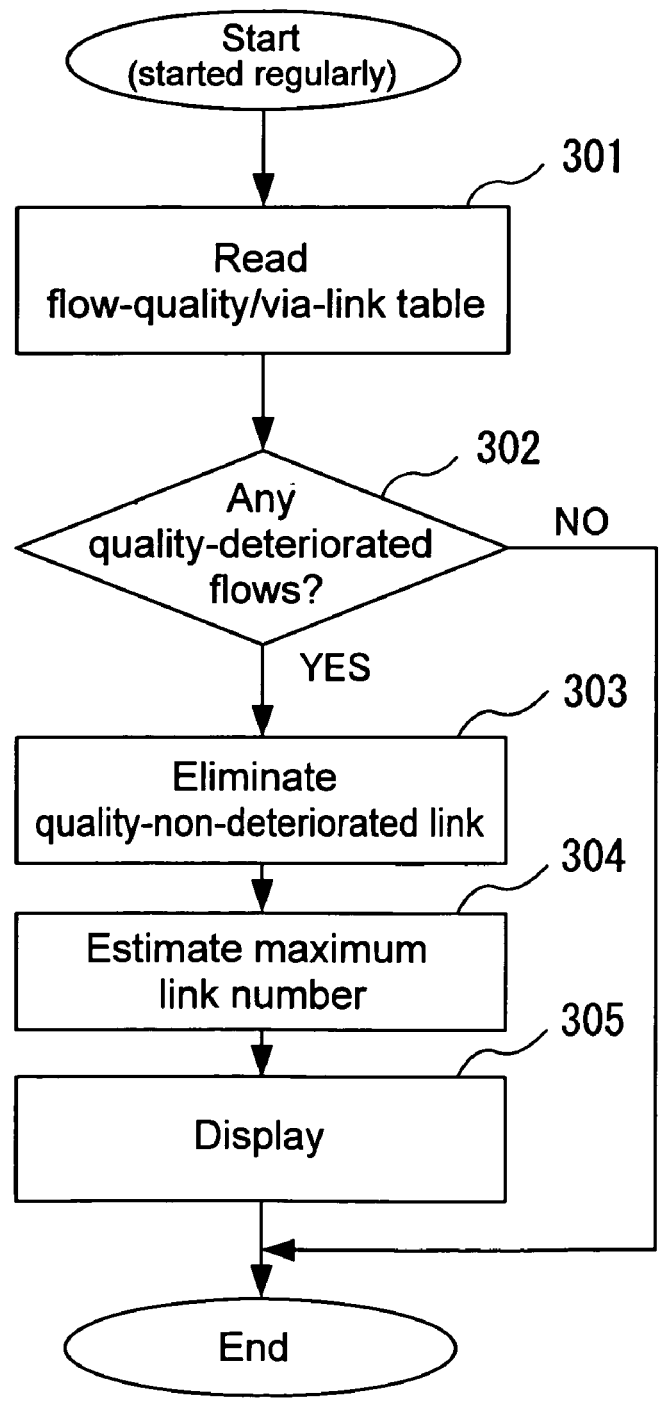
FIG. 13 is a flowchart for showing action of the quality-deteriorated area estimating unit according to the third embodiment of the present invention.

Specifically, as shown in FIG. 13, the estimating unit 15 reads the flow-quality/via-link table from the table storage unit 14 in step 301 and detects whether or not there is the flow with quality deterioration from the table in step 302. In the above-described case, the flows F1-F5 correspond to the quality-deteriorated flows.

When detecting the quality-deteriorated flow (YES in step 302), the estimating unit 15 eliminates the via-link of the flow with fine quality from the set of links that the set of arbitrary quality-deteriorated flows go through. The estimating unit 15 estimates, as the quality-deteriorated area, the subset containing the link that the set of arbitrary quality-deteriorated flows go through, which also has the minimum number of elements, among the subsets of the sets of links after the elimination, and outputs the information thereof to the display unit 16.

In the above-described case, the link set {L1, L20, L30, L80, L120, L140, L150, L161, L171, L191, L201, L210, L220, L141, L181} corresponds to the set of links that the set of arbitrary quality-deteriorated flows {F1-F5} goes through. Further, the links {L120, L10, L20, L30, L181, L151, L141} correspond to the links that the flow with fine quality go through. Further, the links {L80, L140, L161, L171, L191, L201, L210, L220} correspond to the subset of the set of links after the elimination. Furthermore, the links {L80, L161, L191} correspond to the subset containing the links that the arbitrary quality-deteriorated flows go through, which also has the minimum number of elements. Thus, the minimum number of elements is "3".

As described above, the embodiment enables highly accurate estimation of the quality-deteriorated area when the probabilities of causing the flow quality deterioration for each link are independent from each other. The reason is as follows. It is considered the links that the flows of the fine quality go through have no quality deterioration. In this embodiment, those links are eliminated from the estimation target before applying the minimum-link-number estimating method. The minimum-link-number estimating method finds the link with the highest probability of causing deterioration among all the possible quality-deteriorated link sets which may induce the current state of quality deterioration. Eliminating the links with no quality deterioration in the first place allows more improved estimation accuracy.

Furthermore, it is possible with the embodiment to improve speed of estimating the quality-deteriorated area. The reason is as follows. Estimation time is extended extremely when there is an increase in the number of links as the estimation target, however, the third embodiment according to the present invention applies the minimum-link-number estimating method after eliminating the links that are considered as having no quality deterioration. Therefore, the number of links as the estimation target can be decreased, thereby increasing the estimation speed.

Fourth Embodiment

A fourth embodiment according to the present invention is different from the second embodiment of FIG. 9 in terms of the action of the quality-deteriorated area estimating unit (referred to as the estimating unit hereinafter) 15 provided to the quality-deteriorated area estimating server S1.

Figure 17:
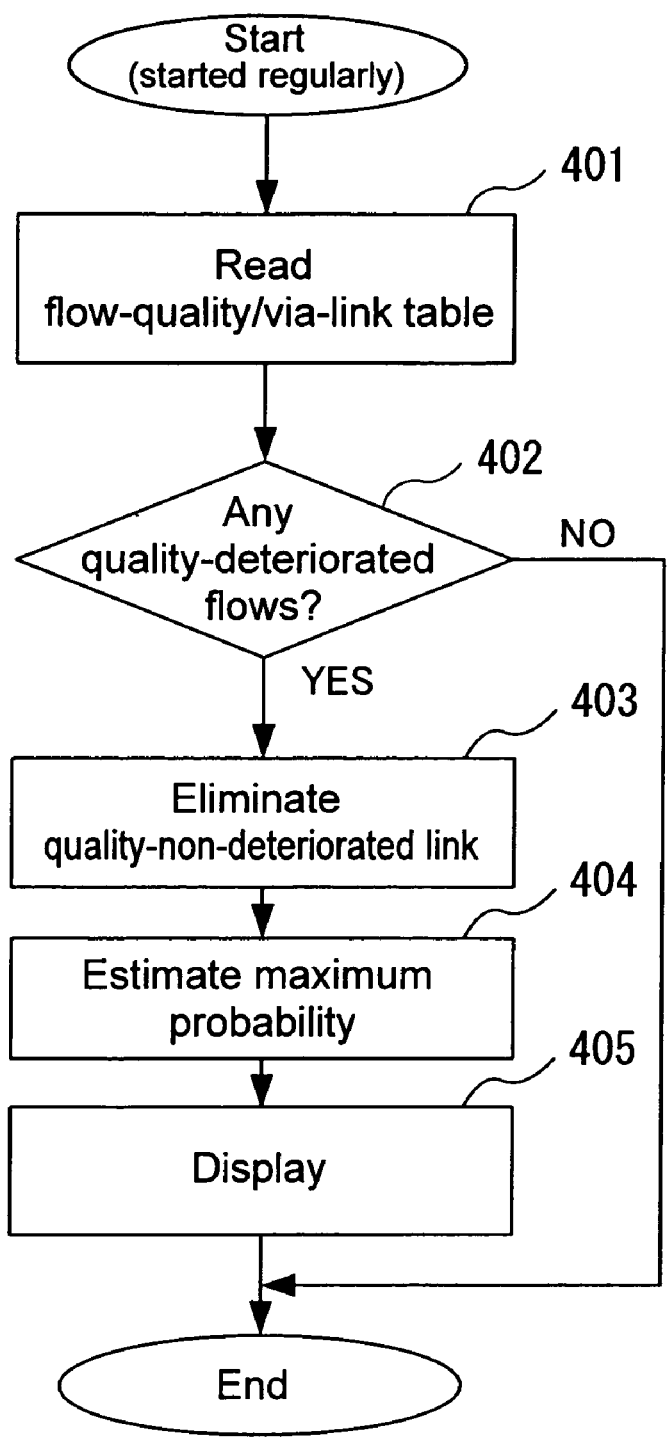
FIG. 17 is a flowchart for showing action of a quality-deteriorated area estimating unit according to a fourth embodiment of the present invention.

The estimating unit 15 reads out the flow-quality/via-link table regularly from the table storage unit 14. When there is a flow with the quality flag of "1", the estimating unit 15 eliminates the quality-non-deteriorated link at first, then estimates the quality-deteriorated area using the highest probability estimating method, and outputs the result to the display unit 16. FIG. 17 shows a flowchart for showing the action of the estimating unit 15.

Elimination of the quality-non-deteriorated link means to eliminate the link, which is in a row of the flow with the quality flag of "0" and has the quality flag of "1" in the via-link section. By way of example, let us look at the case where, in addition to the illustrated example of the second embodiment, new flows F6 and F7 shown by dotted arrows are flown as shown in FIG. 14. It is assumed herein that the current flow-quality/via-link table regarding the flows F1-F7 has the content shown in FIG. 15. The flows F6 and F7 are flows with fine quality, i.e. the quality flag is "0", and it is considered the links L120, L10, L20, L30, L181, L150, L141 that the flows go through have no quality deterioration. FIG. 16 shows the table where those links are eliminated.

Specifically, the estimating unit 15 reads the flow-quality/via-link table from the table storage unit 14 in step 401 of FIG. 17 and detects in step S402 whether or not there is the flow with quality deterioration from the table. In the above-described case, the flows F1-F5 correspond to the quality-deteriorated flows.

When detecting the quality-deteriorated flow (YES in step 402), the estimating unit 15 eliminates the via-link of the flow with fine quality from the set of links that the set of arbitrary quality-deteriorated flows go through (step 403). The estimating unit 15 estimates, as the quality-deteriorated area, the subset containing the link that the set of arbitrary quality-deteriorated flows go through, which is also estimated as having the highest probability of causing the deterioration based on the probability of being the cause for quality deterioration occurred in the past, among the subsets of the sets of links after the elimination (step 404).

Next, application of the highest probability estimating method will be described. Like the second embodiment, the link-quality deteriorating probability storage unit 17 stores the quality deterioration cause probability table shown in FIG. 10, in which each link within the network is corresponded to the probabilities for being the causes of the communication quality deterioration occurred in the past. FIG. 18 shows the flow-quality/via-link table of FIG. 16 to which the table containing the quality deterioration cause probability for each link, which is stored in the link-quality deteriorating probability storage unit 17, is also written in.

When the processing of the step 403 by the estimating unit 15 is completed, the subset of the links obtained by eliminating the links that the flows of the fine quality go through from the set of links that the set of arbitrary flows with quality deterioration goes through are the links shown in FIG. 16. The highest probability estimating method is applied to the link information shown in FIG. 16. When the highest probability estimating method is applied, the sets of via-link columns having the set of flows {F1, F2, F3, F4, F5} belonging thereto are {L80, L161, L191}, {L161, L171, L191, L201} - - - , etc. The estimated generating probabilities are 0.0000001, 0.000001, - - - , respectively, and the set with the highest probability is {L161, L171, L191, L201}.

Thus, the estimating unit 15 eliminates the link that the flow of fine quality goes through from the set of links that the set of the arbitrary quality-deteriorated flows goes through, and estimates, among the subsets of the sets of the links after the elimination, as the quality-deteriorated area, the subset {L161, L71, L191, L201} containing the links that the set of arbitrary quality-deteriorated flows go through, which is also estimated as having the highest probability of causing the deterioration based on the probability of being the cause for quality deterioration occurred in the past, among the subsets of the sets of links after the elimination (step 404). The subset {L161, L171, L191, L201} is outputted as the quality-deteriorated area as a result of the highest probability estimating method. The display unit 16 displays, as the visible image, the estimation result of the quality-deteriorated area outputted from the estimating unit 15.

As described above, the embodiment enables highly accurate estimation of the quality-deteriorated area when the probabilities of causing the flow quality deterioration for each link are independent from each other. The reason is as follows. It is considered that the links that the flows of the fine quality go through have no quality deterioration. In this embodiment, those links are eliminated from the estimation target before applying the highest probability estimating method. The highest probability estimating method finds the link with the highest probability of causing deterioration among all the possible quality-deteriorated link sets which may induce the current state of quality deterioration. Thus, eliminating the links with no quality deterioration in the first place allows more improved estimation accuracy.

Furthermore, it is possible with the embodiment to improve speed of estimating the quality-deteriorated area. The reason is as follows. Estimation time is extended extremely when there is an increase in the number of links as the estimation target, however, the embodiment applies the highest probability estimating method after eliminating the links that are considered as having no quality deterioration. Therefore, the number of links as the estimation target can be decreased, thereby improving the estimation speed.

Fifth Embodiment and Sixth Embodiment

Figure 19:
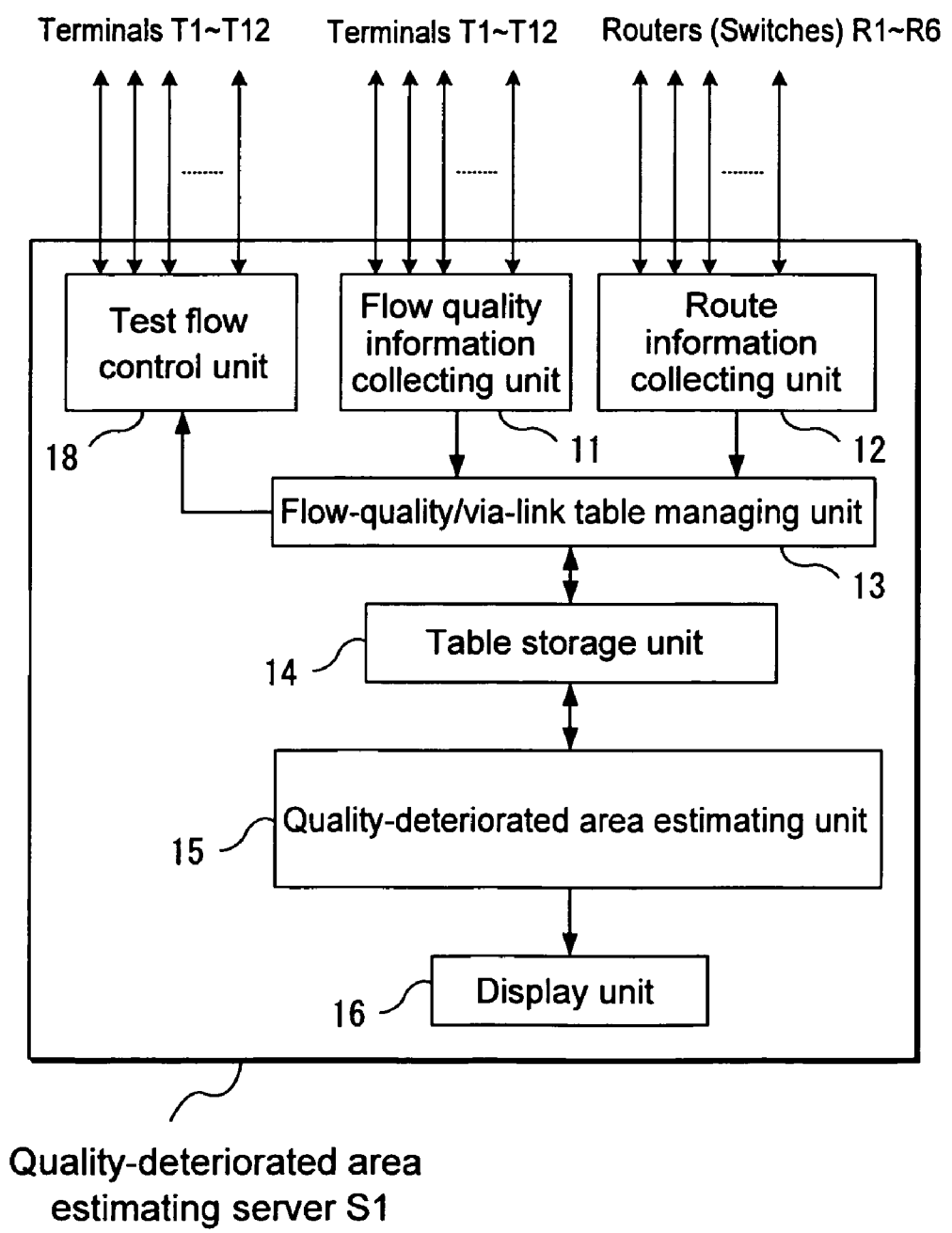
FIG. 19 is a block diagram for showing a structural example of a quality-deteriorated area estimating server according to a fifth embodiment of the present invention.

The embodiment according to the present invention as shown in FIG. 19 is a modification of the third embodiment to which a test flow control unit 18 is added and the actions of the flow quality information collecting unit 11 and the flow-quality/via link table managing unit 13 are altered.

As shown in FIG. 19, the quality-deteriorated area estimating server S1 of the embodiment is different in respect that the test flow control unit 18 is added and information is exchanged among the test flow control unit 18, the flow-quality/via-link table managing unit 13, and the terminals T1-T12.

The terminal is capable of generating test flows according to a command from the test flow control unit 18 in addition to the flows generated by the user. Like the flows of the user, the flow quality of the test flow is sent to the flow quality information collecting unit 11 of the quality-deteriorated area estimating server S1.

In the followings, there will be described the action of the test flow control unit 18 added to the quality-deteriorated area estimating server S1 of the embodiment, and actions of the modified flow quality information collecting unit 11 and the flow-quality/via-link table managing unit 13. Actions of other elements are the same.

The test flow control unit 18 gives a command to the terminal for transmission and termination of the test flow upon receiving a command from the flow-quality/via-link table managing unit 13. In addition to the information of the flows from the user of the network, the flow quality information collecting unit 11 collects the flow quality information including the transmission address, reception address, and the communication quality of the test flow flown by the terminal in accordance with the command from the test flow control unit 18.

Based on the flow quality information obtained from the flow quality information collecting unit 11 and the information regarding the routing from the route information collecting unit 12, the flow-quality/via-link table managing unit 13 holds a flow-quality/via-link table in regards to the flows including the flows flown by the user of the currently communicating network and the test flow flown by the terminal according to the command from the test flow control unit 18. The flow-quality/via-link table is constituted of addresses of transmission/reception terminals, the set of links that those flows are going through currently, and the quality flags indicating the fine/poor state of the current communication quality of the flows. Further, the set of routes for the test flow to flow in is determined depending on the route of the current user flow, and a command is supplied to the test flow control unit 18 for generating the test flow between the terminals indicated by the test flow control unit 18. The set of the test flow routes contains the routes that can determine the quality-deteriorated area highly accurately when there is quality deterioration caused in the user flow.

Referring to the table managed by the flow-quality/via-link table managing unit 13, the quality-deteriorated area estimating unit (referred to as the estimating unit hereinafter) 15 according to the embodiment has functions of: eliminating the link that the flow of fine quality goes through from the set of links that the set of the arbitrary quality-deteriorated flows goes through, and estimating, as the quality-deteriorated area, the subset containing the links that the set of arbitrary quality-deteriorated flows go through, which is also estimated as having the minimum number of elements, among the subsets of the sets of links after the elimination. These functions of the estimating unit 15 are the same as those of the estimating unit 15 of the third embodiment. If there is the state where the estimating unit 15 cannot estimate the quality-deteriorated link when there is quality deterioration at an area of the link that the user flow goes through, it is the case where minimum link estimation indeterminable conditions with elimination of non-deteriorated link, which are described below, apply.

The cases where the minimum link estimation indeterminable conditions with elimination of non-deteriorated link apply are the following cases.

One case is the case of (A) where an arbitrary user flow does not share two or more sections of links with other flows. The other case is the case of (B) where arbitrary two or more flows including at least one user flow share two or more sections of links exclusively by those flows.

When the estimation indeterminable condition is the case of (A), the estimating unit 15 cannot correctly estimate on which link the quality deterioration is caused if there is quality deterioration caused in one of the two or more sections of links. Thus, the estimating unit 15 estimates all the links as the quality deteriorated areas and outputs the wrong estimation result. Furthermore, when the estimation indeterminable condition is the case of (B), the estimating unit 15 cannot correctly estimate on which link the quality deterioration is caused if there is quality deterioration caused in one of the two or more sections of links, so that the estimating unit 15 estimates all the links as the quality deteriorated areas and outputs the wrong estimation result.

Therefore, the flow-quality/via-link table managing unit 13 determines the route for the test flow to flow in based on a following method so that there will be no such situations of (A) and (B) occurred.

There is described the method for determining a test flow route set executed by the flow-quality/via-link table managing unit 13.

First, the flow-quality/via-link table managing unit 13 executes, in order, the following processing for all the routes of the set of routes of the current test flow.

That is, the flow-quality/via-link table managing unit 13 checks whether or not the estimation indeterminable conditions (A), (B) apply when the test flow is eliminated. When acknowledged that neither estimation indeterminable condition (A) nor (B) applies, the flow-quality/via-link table managing unit 13 eliminates the set of routes of the test flow from the set of links.

Then, the flow-quality/via-link table managing unit 13 executes, in order, the following processing for all the flows from the current network user.

That is, the flow-quality/via-link table managing unit 13 checks whether or not the estimation indeterminable condition (A) applies for the flows of the network user. When the estimation indeterminable condition (A) applies, each of two or more sections of links that are not shared with other flows is checked to see whether or not the test flow can be flown threrethrough. When judged that it is possible to flow the test flow, the flow-quality/via-link table managing unit 13 adds the route of the flow to the route set of the test flow.

Then, the flow-quality/via-link table managing unit 13 checks on the estimation indeterminable condition (B). When judged that the estimation indeterminable condition (B) applies, the flow-quality/via-link table managing unit 13 checks each of two or more sections of links that is shared with other flows to see whether or not the test flow can be flown threrethrough. When judged that it is possible to flow the test flow, the flow-quality/via-link table managing unit 13 adds the route of the flow to the route set of the test flow.

Figure 20:
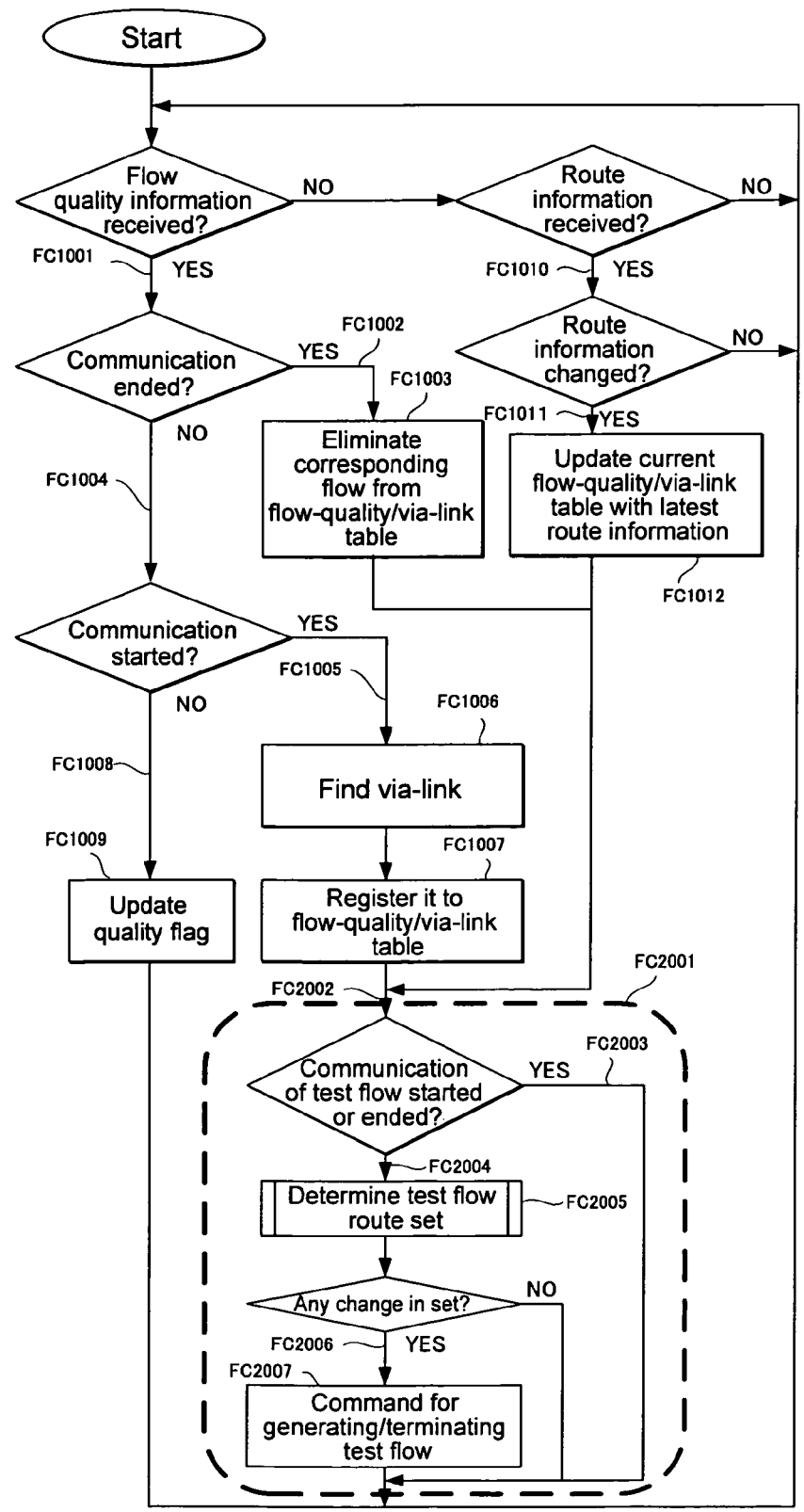
FIG. 20 is a flowchart for showing action of a flow-quality/via-link table managing unit according to the fifth embodiment of the present invention.

FIG. 20 shows a flowchart of the action of the flow-quality/via-link table managing unit 13. Among the action of the flow-quality/via-link table managing unit 13 of FIG. 20, the part surrounded by a broken line FC2001 is different from the action of the flow-quality/via-link table managing unit shown in FIG. 7. Description of other part of the action will be omitted.

In FIG. 20, when a change of via-link is requested, the flow-quality/via-link table managing unit 13 registers the change to the flow-quality/via-link table, and shifts the processing to step FC2002. The flow-quality/via-link table managing unit 13 shifts the processing to the step FC2002 also when there is generation/termination of the flow.

In the case of generation/termination of the test flow (FC2003), the flow-quality/via-link table managing unit 13 does not perform the processing. However, in other cases (FC2004), the flow-quality/via-link table managing unit 13 determines the route set of the test flow (FC2005) by the method for determining the test flow route set described above.

When there is a change in the route set of the link (FC2006), the flow-quality/via-link table managing unit 13 gives a command to the test flow control unit 18 so that the terminal generates or terminates the test flow for the route with the change by the test flow control unit 18.

Figure 21:
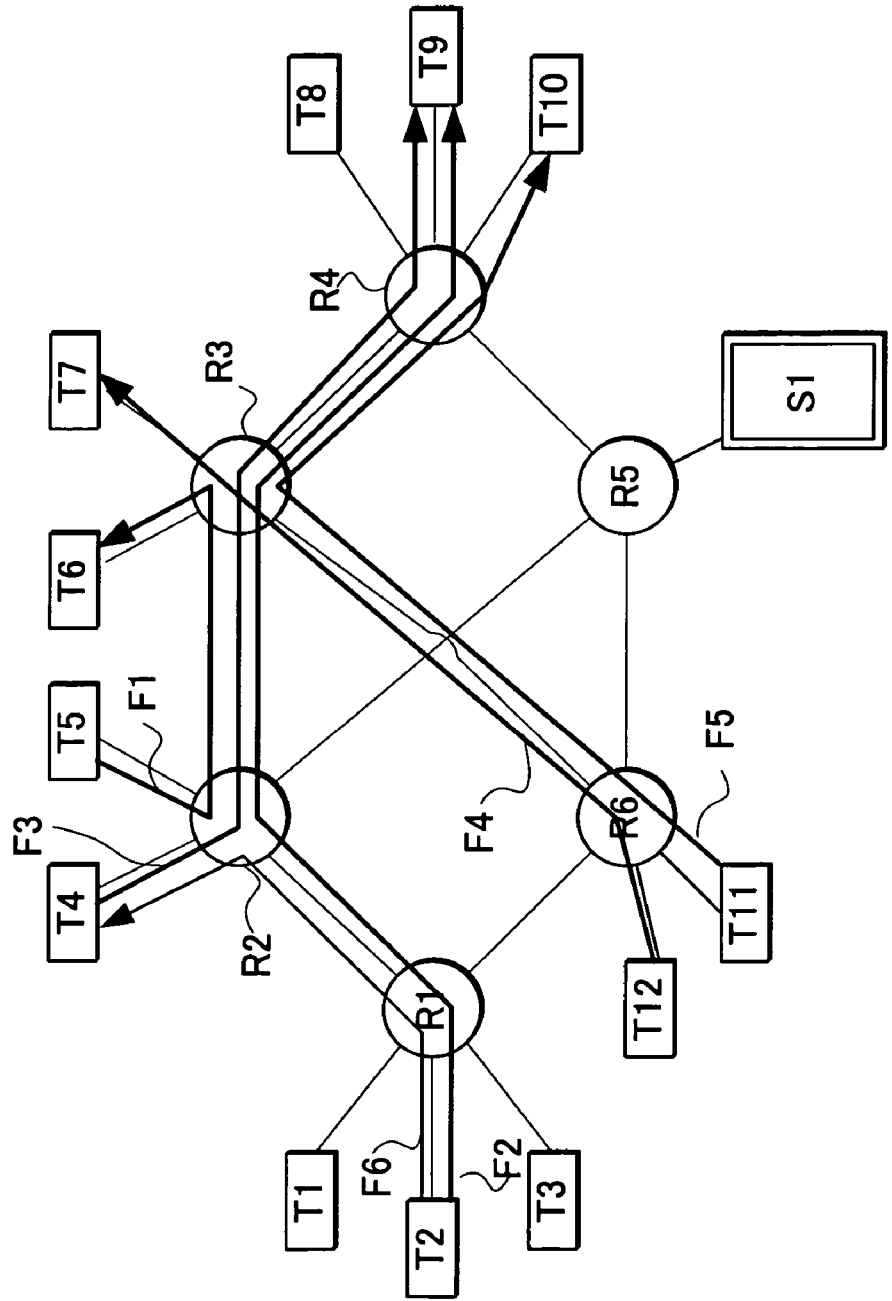
FIG. 21 is a block diagram for showing an example of flows according to the fifth embodiment of the present invention.
Figure 24:
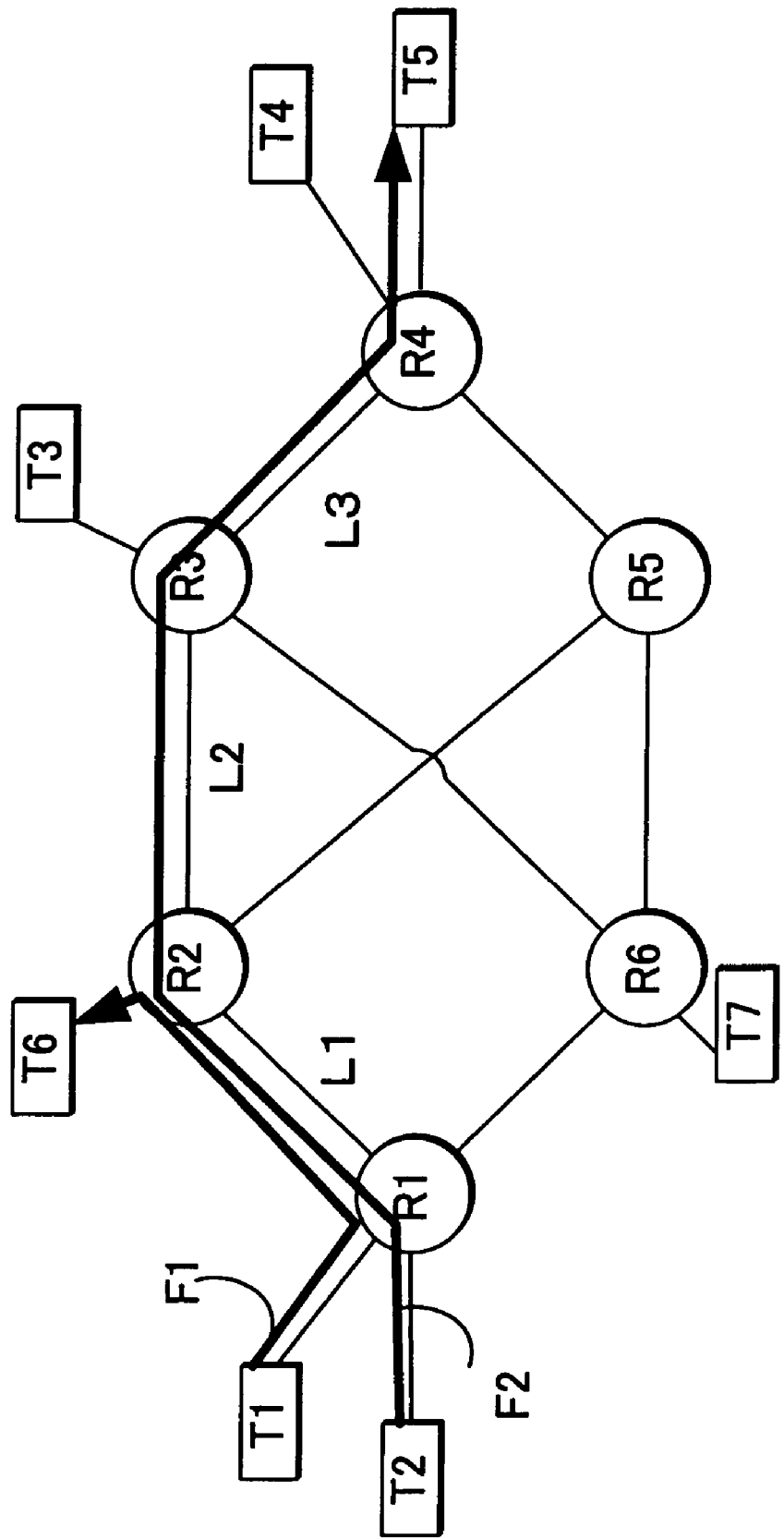
FIG. 24 is a block diagram for showing a conventional quality-deteriorated area estimating method.
Figure 25:
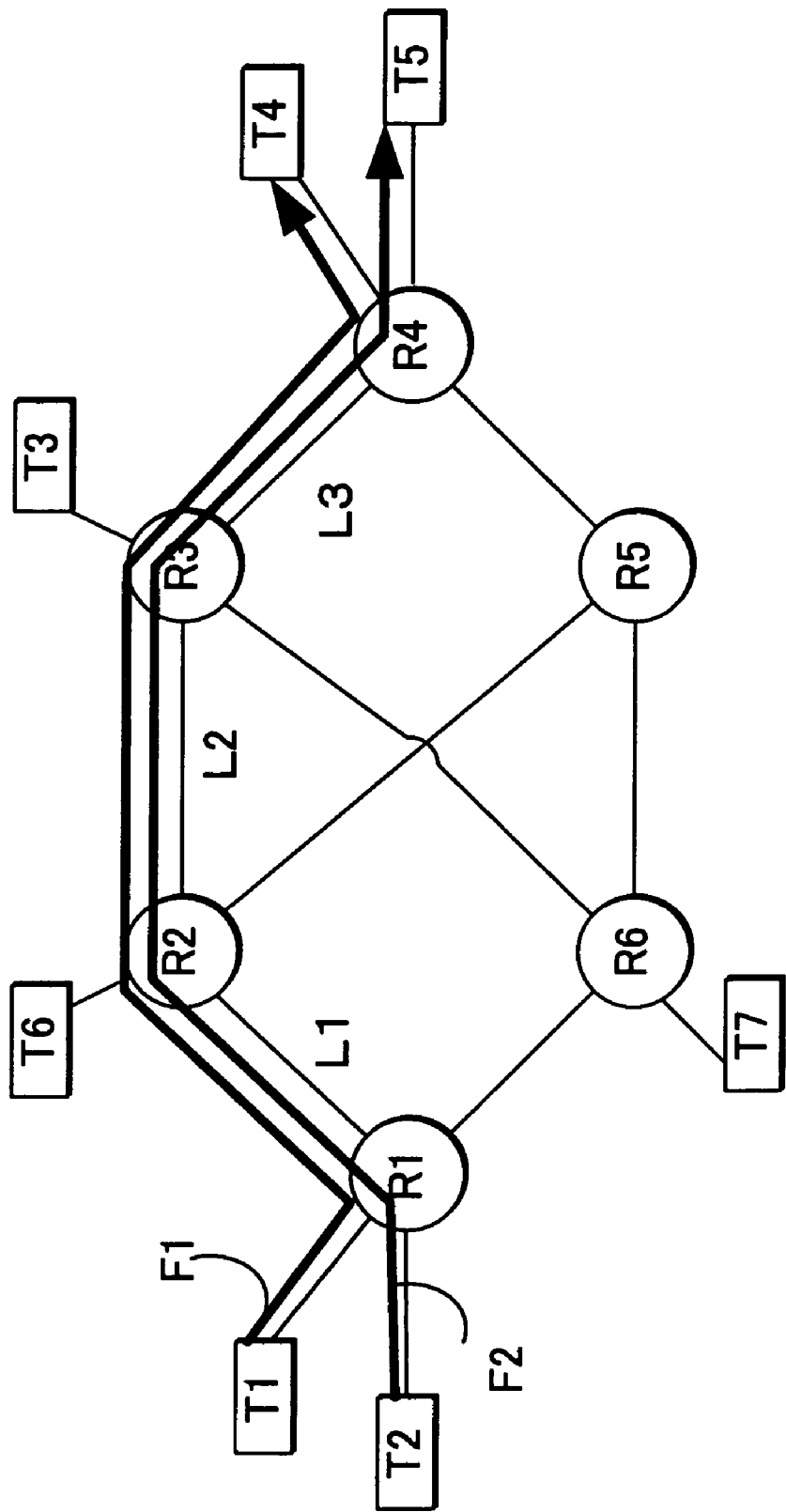
FIG. 25 is a block diagram for describing the first shortcoming of the conventional quality-deteriorated area estimating method.
Figure 26:
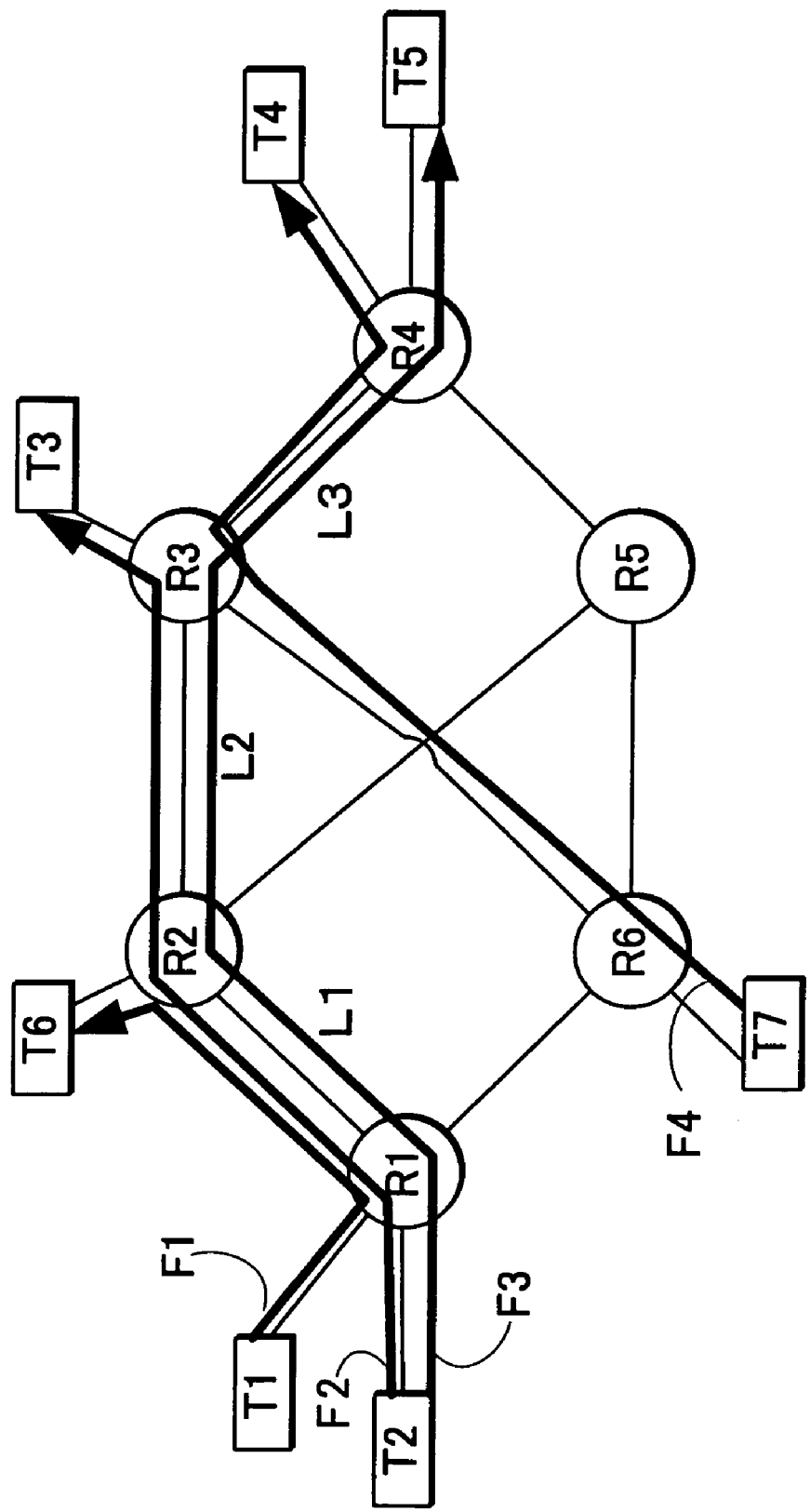
FIG. 26 is a block diagram for describing the second shortcoming of the conventional quality-deteriorated area estimating method.

Specifically, in the case where, for example, flows F1-F6 as shown in FIG. 21 flow in the network of FIG. 1, and there is no quality deterioration in any of the flows, the flow-quality/via-link table has the content shown in FIG. 22.

In FIG. 22, when there is caused quality deterioration in the link L10 to which the estimation indeterminable condition (B) applies, the flows {F2, F6} become the quality-deteriorated flows. The estimating method by the estimating unit 15 of the embodiment estimates both the link {L10} and the link {L120} as the quality-deteriorated areas. Thus, it is not possible to achieve correct estimation of the quality-deteriorated area. Similarly, when the there is caused quality deterioration in the link L150 to which the estimation indeterminable condition (A) applies, the estimating method by the estimating unit 15 of the embodiment also estimates the link {L150} and the link {L160} as the quality-deteriorated areas. Thus, it is not possible to achieve correct estimation of the quality-deteriorated area, either.

In those cases, it is necessary for the flow-quality/via-link table managing unit 13 to determine the route set for the test flow to flow in. When the low-quality/via-link table managing unit 13 determines the route set for the test flow to flow in, the low-quality/via-link table containing the user flows and the test flows has the content shown in FIG. 23.

It is possible to estimate the quality-deteriorated area correctly even if there is quality deterioration occurred in any one of the links within the link set {L10, L20, L30, L80, L120, L140, L150, L160, L171, L191, L201, L210, L220, L141} that the user flows go through, as shown in FIG. 23. In this way, it is possible with the embodiment to improve the accuracy for estimating the quality-deteriorated area.

The quality-deteriorated area estimating device of the first embodiment as shown in FIG. 2 is built as hardware. However, it may be built as a program for executing the processing of FIG. 7 and FIG. 8 in a computer, having a computer-readable medium that constitutes a device for estimating the quality-deteriorated area of the network. The quality-deteriorated area estimating program of the embodiment is built in a computer for executing: a function of collecting flow quality information including a transmitter address, receiver address, and communication quality of a flow flowing in a network; a function of collecting a structure information of the network; functions of finding, based on the flow quality information collected by the flow quality information collecting unit and the structure information of the network collected by the route information collecting unit, a link that the flow goes through, judging occurrence of quality deterioration in the flow, and managing a result thereof in a table form; and a function of estimating, among a subset of a set of links that an arbitrary flow with quality deterioration goes through, a subset including the link that the arbitrary flow with quality deterioration goes through, which also has the minimum number of elements, as a quality deteriorated area in the table managed by the flow-quality/via-link table managing unit.

Further, the quality-deteriorated area estimating device of the second embodiment as shown in FIG. 9 is built as hardware. However, it may be built as a program for executing the processing of FIG. 11 in a computer, having a computer-readable medium that constitutes a device for estimating the quality-deteriorated area of the network. The quality-deteriorated area estimating program of the embodiment is built in a computer for executing: a function of collecting flow quality information including a transmitter address, receiver address, and communication quality of a flow flowing in a network; a function of collecting a structure information of the network; functions of finding, based on the flow quality information collected by the flow quality information collecting unit and the structure information of the network collected by the route information collecting unit, a link that the flow goes through, judging occurrence of quality deterioration in the flow, and managing a result thereof in a table form; a function of storing probability data of each link of the network for being a cause of past quality deterioration; and functions of estimating, among a subset of a set of links that an arbitrary flow with quality deterioration goes through, a subset including the link that the arbitrary flow with quality deterioration goes through, which is also estimated as having highest probability of causing quality deterioration by using the probability data, and estimating the determined subset as a quality deteriorated area in the table managed by the flow-quality/via-link table managing unit.

Furthermore, the quality-deteriorated area estimating device of the third embodiment is built as hardware. However, it may be built as a program for executing the processing of FIG. 13 in a computer, having a computer-readable medium that constitutes a device for estimating the quality-deteriorated area of the network. The quality-deteriorated area estimating program of the embodiment is built in a computer for executing: functions of eliminating a link that a flow with fine quality goes through from the set of the links that the arbitrary flow with quality deterioration goes through, and estimating the subset including the link that the arbitrary flow with quality deterioration goes through among the subset of the set of the links after the elimination, which also has the minimum number of elements, as the quality deteriorated area.

Moreover, the quality-deteriorated area estimating device of the fourth embodiment is built as hardware. However, it may be built as a program for executing the processing of FIG. 17 in a computer, having a computer-readable medium that constitutes a device for estimating the quality-deteriorated area of the network. The quality-deteriorated area estimating program of the embodiment is built in a computer for executing: functions of eliminating a link that a flow with fine quality goes through from the set of the links that the arbitrary flow with quality deterioration goes through, and estimating the subset including the link that the arbitrary flow with quality deterioration goes through among the subset of the set of the links after the elimination, which is also estimated as having the highest probability of causing quality deterioration based on probability of being a cause for past quality deterioration, as the quality deteriorated area.

Further, the quality-deteriorated area estimating device of the fifth embodiment as shown in FIG. 19 is built as hardware. However, it may be built as a program for executing the processing of FIG. 20 in a computer, having a computer-readable medium that constitutes a device for estimating the quality-deteriorated area of the network. The quality-deteriorated area estimating program of the embodiment is built in a computer for executing: a function of collecting flow quality information including transmitter addresses, receiver addresses, and communication qualities of flows that include a network user flow and a test flow and indicating the generation/termination of the test flow to the network terminal; functions of finding, based on the flow quality information and the structure information of the network, a link that the flow goes through, judging occurrence of quality deterioration in the flow, managing a result thereof in a table, and determining a route for the test flow to flow in depending on a route of the user flow; and functions of eliminating a link that a flow with fine quality goes through from the set of the links that an arbitrary flow with quality deterioration goes through, and estimating a subset including the link that the arbitrary flow with quality deterioration goes through among the subset of the set of the links after the elimination, which also has the minimum number of elements, as the quality deteriorated area.

Furthermore, the flow-quality/via-link table managing unit of the quality-deteriorated area estimating device of the fifth embodiment as shown in FIG. 19 is built as hardware. However, it may be built as a program for executing the processing of FIG. 20 in a computer, having a computer-readable medium that constitutes a device for estimating the quality-deteriorated area of the network. The quality-deteriorated area estimating program of the embodiment is built in a computer for executing: a function of determining the route for the test flow to flow in depending on the route of the flow flown by the network user such that, regarding an arbitrary user flow, the user flow does not share two or more sections of links with other flow, and that arbitrary two or more flows including at least one user flow do not share two or more sections of links exclusively by those flows.

What is claimed is:

1. A quality-deteriorated area estimating device, comprising:
    a flow quality information collecting unit for collecting flow quality information including a transmitter address, receiver address, and communication quality of a flow flowing in a network;
    a route information collecting unit for collecting structure information of the network;
    a flow-quality/via-link table managing unit which, based on the flow quality information collected by the flow quality information collecting unit and the structure information of the network collected by the route information collecting unit, finds a link that the flow goes through, judges occurrence of quality deterioration in the flow, and manages a result thereof in a table form; and
    an estimating unit which estimates, among a subset of a set of links that an arbitrary flow with quality deterioration goes through, a subset including the link that the arbitrary flow with quality deterioration goes through, which also has a minimum number of elements, as a quality deteriorated area in a table managed by the flow-quality/via-link table managing unit.

2. The quality-deteriorated area estimating device according to claim 1, wherein the estimating unit eliminates a link that a flow with fine quality goes through from the set of the links that the arbitrary flow with quality deterioration goes through and, among the subset of the set of the links after the elimination, estimates a subset including the link that the arbitrary flow with quality deterioration goes through, which also has the minimum number of elements, as the quality deteriorated area.

3. The quality-deteriorated area estimating device according to claim 1, wherein,
    the flow quality information collecting unit comprises a function of collecting flow quality information that includes transmitter addresses, receiver addresses, and communication qualities of flows including a network user flow and a test flow;
    the flow-quality/via-link table managing unit comprises functions of, based on the flow quality information collected by the flow quality information collecting unit and the structure information of the network collected by the route information collecting unit, finding a link that the flow goes through, judging occurrence of quality deterioration in the flow, managing a result thereof in a table, and determining a route for the test flow to flow in depending on a route of a user flow; and
    the estimating unit comprises functions of eliminating a link that a flow with fine quality goes through from the set of the links that an arbitrary flow with quality deterioration goes through and, among the subset of the set of the links after the elimination, estimating a subset including the link that the arbitrary flow with quality deterioration goes through, which is also has the minimum number of elements, as a quality deteriorated area in the table managed by the flow-quality/via-link table managing unit.

4. The quality-deteriorated area estimating device according to claim 3, wherein, the flow-quality/via-link table managing unit comprises a function of determining the route for the test flow to flow in depending on the route of the flow flown by the network user such that, regarding an arbitrary user flow, the user flow does not share two or more sections of links with other flow, and that arbitrary two or more flows including at least one user flow do not share two or more sections of links exclusively by those flows.

5. A quality deteriorated area estimating device, comprising:
    a flow quality information collecting unit for collecting flow quality information including a transmitter address, receiver address, and communication quality of a flow flowing in a network;
    a route information collecting unit for collecting structure information of the network;
    a flow-quality/via-link table managing unit which, based on the flow quality information collected by the flow quality information collecting unit and the structure information of the network collected by the route information collecting unit, finds a link that the flow goes through, judges occurrence of quality deterioration in the flow, and manages a result thereof in a table form;
    a link-quality deteriorating probability storage unit for storing probability data of each link of the network for being a cause of past quality deterioration; and
    an estimating unit which determines, among a subset of a set of links that an arbitrary flow with quality deterioration goes through, a subset including the link that the arbitrary flow with quality deterioration goes through, which is also estimated as having highest probability of causing quality deterioration by using the probability data, and estimates the determined subset as a quality deteriorated area in a table managed by the flow-quality/via-link table managing unit.

6. The quality-deteriorated area estimating device according to claim 5, wherein the estimating unit eliminates a link that a flow with fine quality goes through from the set of the links that an arbitrary flow with quality deterioration goes through and, among the subset of the set of the links after the elimination, estimates a subset including the link that the arbitrary flow with quality deterioration goes through, which is also estimated as having highest probability of causing quality deterioration based on probability of being a cause for past quality deterioration, as a quality deteriorated area.

7. A quality-deteriorated area estimating method, comprising steps of:
    a flow quality information collecting step for collecting flow quality information including a transmitter address, receiver address, and communication quality of a flow flowing in a network;
    an information collecting step for collecting structure information of the network;
    a managing step which, based on the flow quality information collected by the flow quality information collecting unit and the structure information of the network collected by the route information collecting unit, finds a link that the flow goes through, judges occurrence of quality deterioration in the flow, and manages a result thereof in a table form; and an estimating step which estimates, among a subset of a set of links that an arbitrary flow with quality deterioration goes through, a subset including the link that the arbitrary flow with quality deterioration goes through, which also has a minimum number of elements, as a quality deteriorated area when there is quality deterioration in one or more flow in a table managed by the managing step.

8. The quality-deteriorated area estimating method according to claim 7, wherein, when there is quality deterioration in one or more flow, the estimating step eliminates a link that a flow with fine quality goes through from the set of the links that the arbitrary flow with quality deterioration goes through and, among the subset of the set of the links after the elimination, estimates a subset including the link that the arbitrary flow with quality deterioration goes through, which also has a minimum number of elements, as a quality deteriorated area.

9. The quality-deteriorated area estimating method according to claim 7, wherein:
the quality information collecting step performs processing for collecting the flow quality information including the transmitter address, receiver address, and communication quality of the flow including a network user flow and a test flow;
the managing step performs processing, based on the flow quality information collected by the flow quality information collecting unit and the structure information of the network collected by the route information collecting unit, for finding the link that the flow goes through, judging occurrence of quality deterioration in the flow, managing the result thereof in the table, and determining the route for the test flow to flow in depending on the route of a user flow; and
the estimating step performs processing for eliminating the link that the flow with fine quality goes through from the set of the links that the arbitrary flow with quality deterioration goes through and, among the subset of the set of the links after the elimination, estimating the subset including the link that the arbitrary flow with quality deterioration goes through, which also has the minimum number of elements, as a quality deteriorated area when there is quality deterioration in one or more flow in the table managed by the flow-quality/via-link table managing unit.

10. The quality-deteriorated area estimating method according to claim 9, wherein, the managing step performs processing for determining the route for the test flow to flow in depending on the route of the flow flown by the network user such that, regarding an arbitrary user flow, the user flow does not share two or more sections of links with other flow, and that arbitrary two or more flows including at least one user flow do not share two or more sections of links exclusively by those flows.

11. A quality-deteriorated area estimating method, comprising steps of: a flow quality information collecting step for collecting flow quality information including a transmitter address, receiver address, and communication quality of a flow flowing in a network;
an information collecting step for collecting structure information of the network;
a managing step which, based on the flow quality information collected by the flow quality information collecting unit and the structure information of the network collected by the route information collecting unit, finds a link that the flow goes through, judges occurrence of quality deterioration in the flow, and manages a result thereof in a table form;
a storing step for storing probability data of each link of the network for being a cause of past quality deterioration; and
an estimating step which determines, among a subset of a set of links that an arbitrary flow with quality deterioration goes through, a subset including the link that the arbitrary flow with quality deterioration goes through, which is also estimated as having highest probability of causing quality deterioration by using the probability data, and estimates the determined subset as a quality deteriorated area when there is quality deterioration in one or more flow in a table managed by the flow-quality/via-link table managing unit.

12. The quality-deteriorated area estimating method according to claim 11, wherein, when there is quality deterioration in one or more flow, the estimating step eliminates a link that a flow with fine quality goes through from the set of the links that the arbitrary flow with quality deterioration goes through, and estimates a subset including the link that the arbitrary flow with quality deterioration goes through among the subset of the set of the links after the elimination, which is also estimated as having highest probability of causing quality deterioration based on probability of being a cause for past quality deterioration, as a quality deteriorated area.

13. A quality-deteriorated area estimating program, embodied in a computer-readable medium, for a computer that constitutes a device for estimating a quality-deteriorated area of a network, the program executing:
a function of collecting flow quality information including a transmitter address, receiver address, and communication quality of a flow flowing in a network;
a function of collecting a structure information of the network;
functions of finding, based on the flow quality information collected by the flow quality information collecting unit and the structure information of the network collected by the route information collecting unit, a link that the flow goes through, judging occurrence of quality deterioration in the flow, and managing a result thereof in a table form; and
a function of estimating, among a subset of a set of links that an arbitrary flow with quality deterioration goes through, a subset including the link that the arbitrary flow with quality deterioration goes through, which also has a minimum number of elements, as a quality deteriorated area in a table managed by the flow-quality/via-link table managing unit.

14. The quality-deteriorated area estimating program, embodied in a computer-readable medium according to claim 13 for executing, by the computer, functions of eliminating a link that a flow with fine quality goes through from the set of the links that the arbitrary flow with quality deterioration goes through and, among the subset of the set of the links after the elimination, estimating the subset including the link that the arbitrary flow with quality deterioration goes through, which also has the minimum number of elements, as the quality deteriorated area.

15. The quality-deteriorated area estimating program, embodied in a computer-readable medium according to claim 13 for executing, by the computer:
a function of collecting flow quality information including transmitter addresses, receiver addresses, and communication qualities of flows that include a network user flow and a test flow;
functions of finding, based on the flow quality information and the structure information of the network, a link that the flow goes through, judging occurrence of quality deterioration in the flow, managing a result thereof in a table, and determining a route for the test flow to flow in depending on a route of the user flow; and functions of eliminating a link that a flow with fine quality goes through from the set of the links that an arbitrary flow with quality deterioration goes through in the table managed by the flow-quality/via-link table managing unit, and estimating a subset including the link that the arbitrary flow with quality deterioration goes through among the subset of the set of the links after the elimination, which also has the minimum number of elements, as the quality deteriorated area.

16. The quality-deteriorated area estimating program, embodied in a computer-readable medium according to claim 15 for executing, by the computer, a function of determining the route for the test flow to flow in depending on the route of the flow flown by the network user such that, regarding an arbitrary user flow, the user flow does not share two or more sections of links with other flow, and that arbitrary two or more flows including at least one user flow do not share two or more sections of links exclusively by those flows.

17. A quality-deteriorated area estimating program, embodied in a computer-readable medium for a computer that constitutes a device for estimating a quality-deteriorated area of a network, the program executing: a function of collecting flow quality information including a transmitter address, receiver address, and communication quality of a flow flowing in a network;

a function of collecting a structure information of the network functions of finding, based on the flow quality information collected by the flow quality information collecting unit and the structure information of the network collected by the route information collecting unit, a link that the flow goes through, judging occurrence of quality deterioration in the flow, and managing a result thereof in a table form;

a function of storing probability data of each link of the network for being a cause of past quality deterioration; and functions of determining, among a subset of a set of links that an arbitrary flow with quality deterioration goes through, a subset including the link that the arbitrary flow with quality deterioration goes through, which is also estimated as having highest probability of causing quality deterioration by using the probability data, and estimating the determined subset as a quality deteriorated area in a table managed by the flow-quality/via-link table managing unit.

18. The quality-deteriorated area estimating program, embodied in a computer-readable medium according to claim 17 for executing, by the computer, functions of eliminating a link that a flow with fine quality goes through from the set of the links that the arbitrary flow with quality deterioration goes through, and estimating the subset including the link that the arbitrary flow with quality deterioration goes through among the subset of the set of the links after the elimination, which is also estimated as having highest probability of causing quality deterioration based on probability of being a cause for past quality deterioration, as the quality deteriorated area.

* * * * *